United States Patent
Hirata et al.

(10) Patent No.: US 12,082,024 B2
(45) Date of Patent: Sep. 3, 2024

(54) WIRELESS BASE STATION AND TERMINAL DEVICE

(71) Applicant: SONY GROUP CORPORATION, Tokyo (JP)

(72) Inventors: Ryuichi Hirata, Tokyo (JP); Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 421 days.

(21) Appl. No.: 17/309,912

(22) PCT Filed: Dec. 27, 2019

(86) PCT No.: PCT/JP2019/051401
§ 371 (c)(1),
(2) Date: Jun. 29, 2021

(87) PCT Pub. No.: WO2020/145194
PCT Pub. Date: Jul. 16, 2020

(65) Prior Publication Data
US 2022/0116807 A1 Apr. 14, 2022

(30) Foreign Application Priority Data
Jan. 11, 2019 (JP) ................................. 2019-003742

(51) Int. Cl.
*H04W 24/10* (2009.01)
*H04B 17/309* (2015.01)

(52) U.S. Cl.
CPC .......... *H04W 24/10* (2013.01); *H04B 17/309* (2015.01)

(58) Field of Classification Search
CPC .............................. H04W 24/10; H04B 17/309
See application file for complete search history.

(56) References Cited

U.S. PATENT DOCUMENTS

2012/0230443 A1 9/2012 Seok
2013/0258974 A1* 10/2013 Lee ....................... H04W 24/10
370/329

(Continued)

FOREIGN PATENT DOCUMENTS

BR 112019016747 A2 4/2020
CA 3049131 A1 8/2018

(Continued)

OTHER PUBLICATIONS

Office Action for EP Patent Application No. 19909542.3, issued on Feb. 8, 2022, 10 pages of Office Action.

(Continued)

*Primary Examiner* — Derrick V Rose
(74) *Attorney, Agent, or Firm* — CHIP LAW GROUP

(57) ABSTRACT

The present disclosure relates to a wireless base station and a terminal device that can shorten time required for sounding information collection by a plurality of wireless base stations and suppress deterioration of following accuracy. When a wireless base station as a master performs channel measurement with a terminal device, it is possible to transmit channel measurement frames in wireless base stations including the wireless base station at the same timing or at different timings only by instructing another wireless base station to perform a channel measurement, and also transmitting a Sounding Trigger frame including a transmission timing and a transmission stream of a channel measurement frame once. The present disclosure can be applied to communication systems in wireless LAN.

20 Claims, 19 Drawing Sheets

(56) References Cited

U.S. PATENT DOCUMENTS

| | | |
|---|---|---|
| 2016/0197655 A1 | 7/2016 | Lee et al. |
| 2017/0079027 A1 | 3/2017 | Chun et al. |
| 2017/0134187 A1 | 5/2017 | Chen |
| 2018/0213424 A1 | 7/2018 | Du |
| 2018/0234135 A1* | 8/2018 | Vermani ............... H04L 5/0044 |
| 2018/0310273 A1 | 10/2018 | Chu |
| 2019/0045366 A1 | 2/2019 | Vermani et al. |
| 2019/0081664 A1* | 3/2019 | Vermani ............... H04L 5/0035 |
| 2020/0059808 A1 | 2/2020 | Lim et al. |
| 2021/0006980 A1 | 1/2021 | Vermani et al. |
| 2021/0226671 A1 | 7/2021 | Vermani et al. |

FOREIGN PATENT DOCUMENTS

| | | |
|---|---|---|
| CN | 102461003 A | 5/2012 |
| CN | 102845101 A | 12/2012 |
| CN | 106304390 A | 1/2017 |
| CN | 108352883 A | 7/2018 |
| CN | 110291724 A | 9/2019 |
| CN | 111133818 A | 5/2020 |
| CN | 113193887 A | 7/2021 |
| EP | 3133757 A1 | 2/2017 |
| EP | 3583702 A1 | 12/2019 |
| EP | 3525511 A1 | 1/2022 |
| KR | 10-2015-0028738 A | 3/2015 |
| KR | 10-2019-0116308 A | 10/2019 |
| KR | 10-2021-0031797 A | 3/2021 |
| SG | 11201905921 P | 8/2019 |
| WO | WO-2010148076 A1 | 12/2010 |
| WO | 2015/034304 A1 | 3/2015 |
| WO | WO-2016192510 A1 | 12/2016 |
| WO | 2017/030295 A1 | 2/2017 |
| WO | 2018/093132 A1 | 5/2018 |
| WO | WO-2018136254 A1 | 7/2018 |
| WO | 2018/151888 A1 | 8/2018 |
| WO | 2019/028265 A1 | 2/2019 |

OTHER PUBLICATIONS

Liu, et al., "Consideration on multi-AP coordination for EHT", XP068147487, IEEE-SA Mentor, Piscataway, USA, No. 1, Jan. 9, 2019, pp. 1-10.

Porat, et al., "Constrained Distributed MU-MIMO", IEEE 802.11-18/1439r0, Sep. 2018, pp. 09.

International Search Report and Written Opinion of PCT Application No. PCT/JP2019/051401, issued on Feb. 10, 2020, 10 pages of ISRWO.

* cited by examiner

FIG. 9

LTF~LTF4

$$\begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

mapping matrix

FIG. 14

| Reserved | HE | FRAME TYPE |
|---|---|---|
| 0 | 0 | VHT NDP Announcement |
| 0 | 1 | HE NDP Announcement |
| 1 | 0 | Sounding Trigger |
| 1 | 1 | — |

WIRELESS BASE STATION AND TERMINAL DEVICE

CROSS REFERENCE TO RELATED APPLICATIONS

This application is a U.S. National Phase of International Patent Application No. PCT/JP2019/051401 filed on Dec. 27, 2019, which claims priority benefit of Japanese Patent Application No. JP 2019-003742 filed in the Japan Patent Office on Jan. 11, 2019. Each of the above-referenced applications is hereby incorporated herein by reference in its entirety.

TECHNICAL FIELD

The present disclosure relates to a wireless base station and a terminal device, and more particularly to a wireless base station and a terminal device that can shorten time required for sounding information collection by a plurality of wireless base stations and suppress deterioration of following accuracy.

BACKGROUND ART

In recent years, a plurality of wireless base stations has been installed even in a home.

Moreover, in the next-generation IEEE 802.11 standard, it is assumed that transmission is performed by cooperation of wireless base stations, for example, simultaneous transmission from a plurality of wireless base stations to one terminal device. At this case, each wireless base station needs to acquire information about a channel with the terminal device by sounding.

It is known that, in a case where each wireless base station performs sounding independently by the Explicit Feedback method, since a frame for sounding such as a Null Data Packet Announcement (NDP-A) frame or a Null Data Packet (NDP) frame needs to be transmitted each time, sounding takes time, and the degree of followability to channel fluctuations deteriorates.

Therefore, a method of simultaneously transmitting NDP-A frames or NDP frames by wireless base stations as a slave of a wireless base station as a master by a trigger from the wireless base station as a master to shorten the sounding sequence in a plurality of wireless base stations has been proposed (Non-Patent Document 1).

CITATION LIST

Non-Patent Document

Non-Patent Document 1: IEEE 802.11-18/1439r0

SUMMARY OF THE INVENTION

Problems to be Solved by the Invention

However, in the technology of Non-Patent Document 1, only a case where wireless base stations cooperate with each other to simultaneously transmit a frame for sounding is assumed, and transmission of a frame for sounding by each wireless base station independently is not assumed.

Therefore, sounding cannot be realized in a case where each wireless base station independently transmits a frame for sounding.

The present disclosure has been made in view of such a situation, and in particular, the present disclosure shortens time required for collecting sounding information for a plurality of wireless base stations and suppresses deterioration of following accuracy.

Solutions to Problems

A wireless base station of a first aspect of the present disclosure is a wireless base station including a control unit that performs control to transmit a start frame instructing another wireless base station to perform a channel measurement when performing a channel measurement with a terminal device.

In the first aspect of the present disclosure, control is made to transmit a start frame instructing another wireless base station to perform a channel measurement when performing a channel measurement with a terminal device.

A wireless base station of a second aspect of the present disclosure is a wireless base station including a control unit that performs control to receive a start frame transmitted from another wireless base station and instructing to perform a channel measurement with a terminal device, and also performs control to transmit a channel measurement frame on the basis of at least one of timing information or spatial information for transmitting the channel measurement frame that is a frame for a channel measurement described in the start frame.

In the second aspect of the present disclosure, control is made to receive a start frame transmitted from another wireless base station and instructing to perform a channel measurement with a terminal device, and also control is made to transmit a channel measurement frame on the basis of at least one of timing information or spatial information for transmitting the channel measurement frame that is a frame for a channel measurement described in the start frame.

A terminal device of a third aspect of the present disclosure is a terminal device including a control unit that performs control to receive a start frame including, as transmission method information, information transmitted from a wireless base station and instructing to perform a channel measurement between the terminal device and the wireless base station, and also instructing a transmission method when transmitting a channel measurement result that is a result of the channel measurement to the wireless base station, performs control to receive a frame for a channel measurement transmitted from the wireless base station to perform the channel measurement on the basis of the start frame, and performs control to transmit the channel measurement result to the wireless base station on the basis of the transmission method information.

In the third aspect of the present disclosure, control is made to receive a start frame including, as transmission method information, information transmitted from a wireless base station and instructing to perform a channel measurement between the terminal device and the wireless base station, and also instructing a transmission method when transmitting a channel measurement result that is a result of the channel measurement to the wireless base station, control is made to receive a frame for a channel measurement transmitted from the wireless base station to perform the channel measurement on the basis of the start frame, and control is made to transmit the channel measurement result to the wireless base station on the basis of the transmission method information.

BRIEF DESCRIPTION OF DRAWINGS

FIG. 9 is a diagram for explaining a mapping matrix.

FIG. 14 is a diagram for explaining an application example in the first embodiment.

MODE FOR CARRYING OUT THE INVENTION

Figure 1:
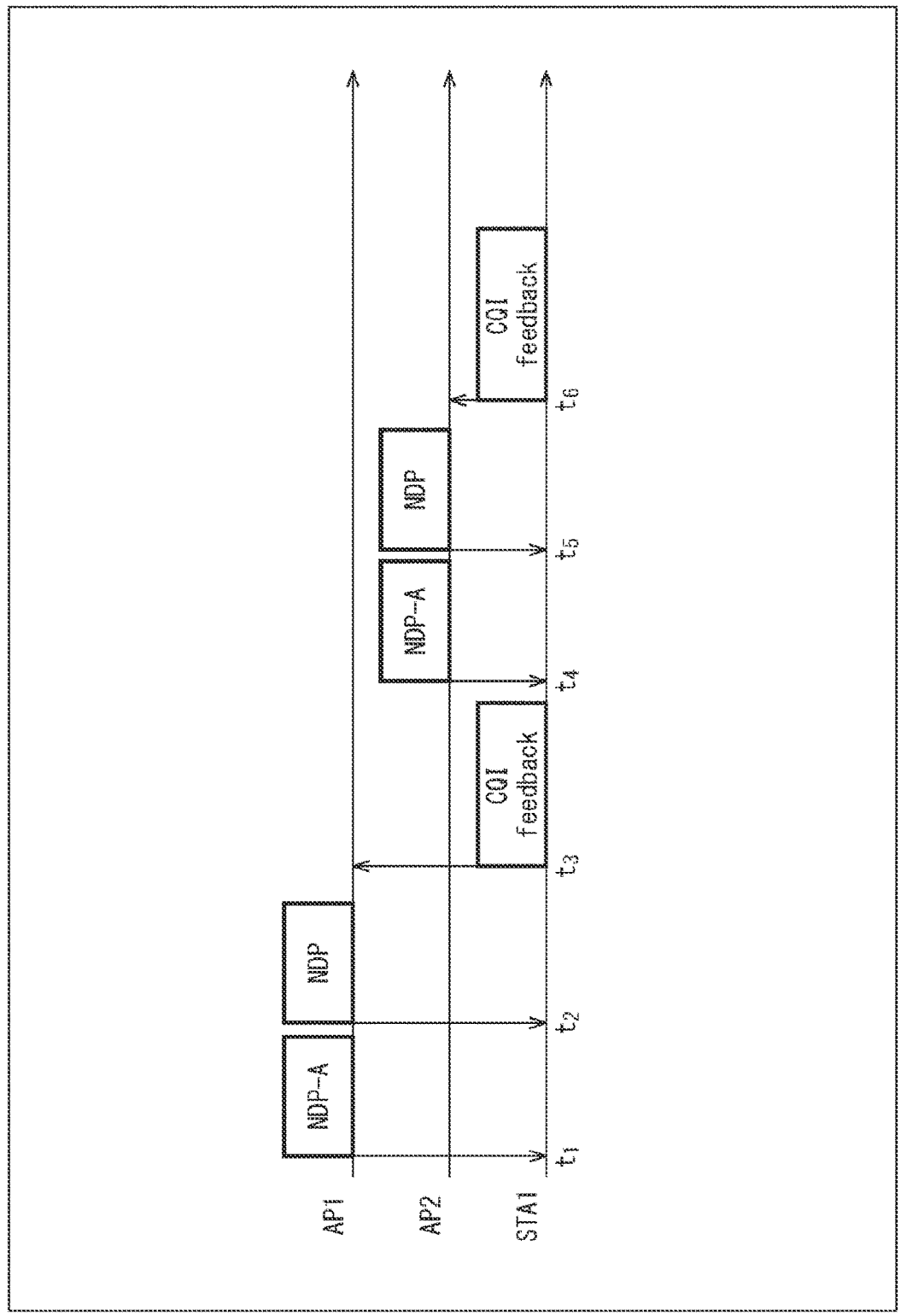
FIG. 1 is a timing chart for explaining standardized sounding.

Preferred embodiments of the present disclosure will be described in detail below with reference to the accompanying drawings. Note that, in the present specification and the drawings, the same reference numerals are given to the constituent elements having substantially the same functional configuration, and redundant explanations are omitted.

Hereinafter, embodiments for carrying out the present technology will be described. The description will be given in the following order.

1. Outline of the present disclosure
2. First embodiment
3. Application example of first embodiment
4. Second embodiment
5. Example of executing by software 1. Outline of the Present Disclosure <Standardized Sounding>

The present disclosure is a communication system that shortens time required for collecting sounding information for a plurality of base stations in a wireless LAN (wireless local area network, wave local area network) standardized by IEEE 802.11, and suppresses degradation of following accuracy.

Before describing a communication system of the present disclosure, the outline of the present disclosure will be described.

For example, consider sounding in a communication system standardized by IEEE 802.11 and including wireless base stations (Access Point) AP1, AP2, and a terminal device STA1.

In such a case, in a case of the Explicit feedback method sounding described in the IEEE 802.11ax standard, the wireless base stations AP1, AP2 transmit to the terminal device STA1 a null data packet (NDP) frame for checking a reception state in the terminal device STA1, and the terminal device STA1 receives the NDP frame.

Then, the terminal device STA1 measures a channel quality indicator (CQI) which is the reception state of the NDP, generates a CQI feedback frame on the basis of the measurement result, and returns the CQI feedback frame to the wireless base stations AP1, AP2.

The wireless base stations AP1, AP2 derive an optimum transfer function for a transmission path on the basis of a CQI feedback frame returned from the terminal device STA1 and realize optimum beamforming for the terminal device STA1.

More specifically, as illustrated in a timing chart of FIG. 1, at time t1, the wireless base station AP1 as a master transmits an NDP-announcement (NDP-A) frame, which is information that specifies a frame format of a NDP frame, to the terminal device STA1.

By receiving this NDP-A frame, the terminal device STA1 recognizes the frame format of the NDP frame from the wireless base station AP1 that is transmitted next.

At time t2, the wireless base station AP1 transmits the NDP frame.

Here, the terminal device STA1 receives the NDP frame transmitted from the wireless base station AP1 and measures the CQI.

Then, at time t3, the terminal device STA1 generates a CQI feedback frame for feeding back the CQI which is the measurement result, and transmits the CQI feedback frame to the wireless base station AP1.

The wireless base station AP1 receives the transmitted CQI feedback frame, derives the optimum transfer function for the transmission path to the terminal device STA1, and realizes optimum beamforming for the terminal device STA1.

Similarly, at time t4, the wireless base station AP2 as a slave of the wireless base station AP1 transmits an NDP-announcement (NDP-A) frame, which is information that specifies the frame format of the NDP, to the terminal device STA1.

By receiving this NDP-A frame, the terminal device STA1 recognizes the frame format of the NDP frame from the wireless base station AP2 that is transmitted next.

At time t5, the wireless base station AP2 transmits the NDP frame.

Here, the terminal device STA1 receives the NDP frame transmitted from the wireless base station AP2 and measures the CQI.

Then, at time t6, the terminal device STA1 generates a CQI feedback frame for feeding back the CQI which is the measurement result, and transmits the CQI feedback frame to the wireless base station AP2.

The wireless base station AP2 receives the transmitted CQI feedback frame, derives the optimum transfer function for the transmission path to the terminal device STA1, and realizes the optimum beamforming to the terminal device STA1.

Sounding is realized by the above series of processing.

<Proposed Sounding>

However, a sequence in which each of the wireless base stations AP1, AP2 independently transmits the NDP-A frame and the NDP frame and receives the CQI feedback from the terminal device STA1 is repeated for the number of the wireless base stations AP1, AP2.

For this reason, it takes time for all the wireless base stations AP1, AP2 to collect the CQI, and there is a risk that the followability will deteriorate.

Therefore, the wireless base station AP1 as a master transmits a Slave Trigger frame for transmitting the NDP-A frame and the NDP frame synchronously to the wireless base station AP2 as a slave.

Then, a technology has been proposed in which the wireless base station AP2 can transmit the NDP-A frame and the NDP frame in synchronization with the wireless base station AP1 as a master on the basis of the Slave Trigger frame.

Figure 2:
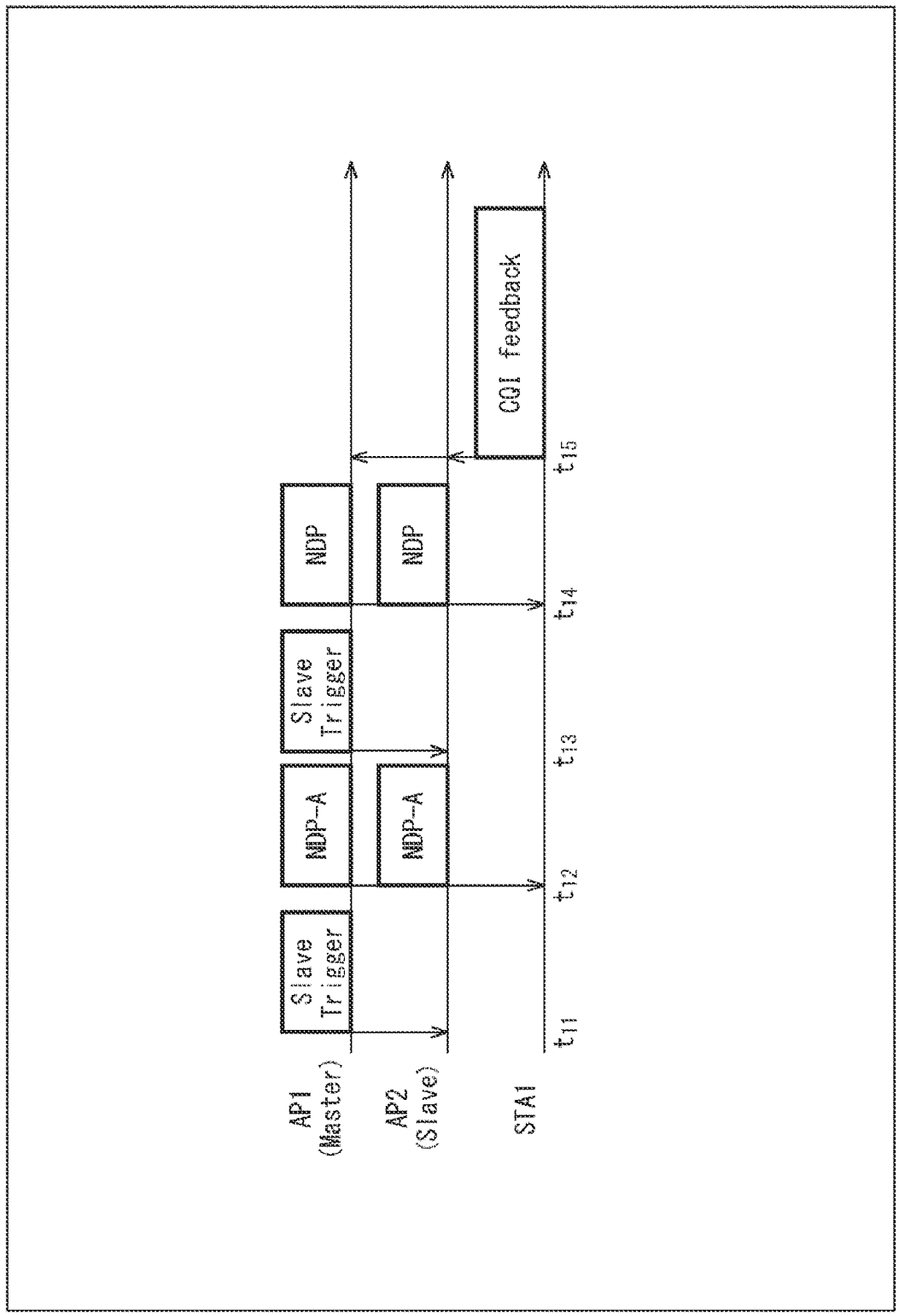
FIG. 2 is a timing chart for explaining proposed sounding.

That is, more specifically, as illustrated in the timing chart of FIG. 2, at time t11, the wireless base station AP1 as a master transmits the Slave Trigger frame instructing to transmit the NDP-A frame, to the wireless base station AP2 as a slave.

Therefore, the wireless base station AP2 as a slave recognizes the transmission instruction of the NDP-A frame.

Furthermore, in the Slave Trigger frame, a transmission stream and the like when transmitting the NDP-A in the wireless base station AP2 as a slave are also specified.

The wireless base station AP2 transmits the NDP-A frame in this specified transmission stream.

The transmission stream specified when transmitting the NDP-A frame included in the Slave Trigger frame is a transmission stream each different from that of other wireless base stations, and the terminal device STA1 can receive NDP-A frames from the wireless base stations AP1, AP2 distinguishing the frames with each other.

Then, at time t12, the wireless base stations AP1, AP2 simultaneously transmit NDP-A frames in synchronization.

At this time, the terminal device STA1 receives the NDP-A frame transmitted from each of the wireless base stations AP1, AP2, and recognizes the format of the NDP frames from the wireless base stations AP1, AP2.

At time t13, the wireless base station AP1 as a master transmits a Slave Trigger frame instructing transmission of the NDP frame, to the wireless base station AP2 as a slave.

Therefore, the wireless base station AP2 as a slave recognizes the transmission instruction of the NDP frame.

Furthermore, in the Slave Trigger frame, a transmission stream and the like when transmitting the NDP frame in the wireless base station AP2 as a slave are also specified.

The wireless base station AP2 transmits the NDP frame in this specified transmission stream.

The transmission stream specified when transmitting the NDP frame included in the Slave Trigger frame is a transmission stream each different from that of other wireless base stations, and the terminal device STA1 can receive NDP frames from the wireless base stations AP1, AP2 distinguishing the frames with each other.

Then, at time t14, the wireless base stations AP1, AP2 simultaneously transmit NDP frames in synchronization.

At this time, the terminal device STA1 receives the NDP frames transmitted from the wireless base stations AP1, AP2, receives the NDP frames from each of the wireless base stations AP1, AP2, and measures each CQI.

Then, at time t15, the terminal device STA1 generates a CQI feedback frame including both CQIs, which are the measurement results of the respective NDP frames from the wireless base stations AP1, AP2, and transmits the CQI feedback frame to the wireless base stations AP1, AP2.

The wireless base stations AP1, AP2 receive each of the transmitted CQI feedback frames, derive the optimum transfer function for the transmission path to the terminal device STA1 on the basis of each CQI, and realize the optimum beamforming to the terminal device STA1.

By the above processing, the NDP-A frame and the NDP frame from the wireless base stations AP1, AP2 can be transmitted only once.

Furthermore, the terminal device STA1 only needs to transmit the CQI feedback frame including the CQIs of both the wireless base stations AP1, AP2 to the wireless base stations AP1, AP2 only once.

In either case, the collection of the CQI in the wireless base stations AP1, AP2 can be performed quickly.

<Sounding of the Present Disclosure>

However, in the proposed sounding described with reference to the timing chart in FIG. 2, it is necessary to transmit the Slave Trigger frame at the timing immediately before each time when the NDP-A frame or NDP frame is transmitted, and the time required for collecting the CQI is required accordingly.

Furthermore, the subordinate wireless base station AP2 has to transmit the NDP-A frame and NDP frame at the timing when a predetermined time has elapsed after receiving the Slave Trigger frame, so that NDP-A frames and NDP frames are transmitted from a plurality of wireless base stations synchronously.

Therefore, in a case where a plurality of wireless base stations is configured to be able to transmit NDP-A frames and NDP frames at a coordinated and synchronized timing, sounding can be realized. However, in a case where a plurality of wireless base stations is each configured to be able to transmit NDP-A frames and NDP frames only independently, sounding cannot be realized.

Therefore, in the present disclosure, the Sounding Trigger frame for notifying the start of synchronized sounding is defined.

In addition to the information corresponding to the NDP-A frame, the Sounding Trigger frame includes description of information about at least one of a transmission timing or transmission parameters of the NDP frame with respect to the wireless base station AP2 as a slave and the terminal device STA1, and a transmission method when the CQI feedback frame is transmitted from the terminal device STA1.

Therefore, a plurality of wireless base stations can transmit the NDP frame at the same timing or at different timings on the basis of the transmission timing of the NDP frame described in the Sounding Trigger frame.

Figure 3:
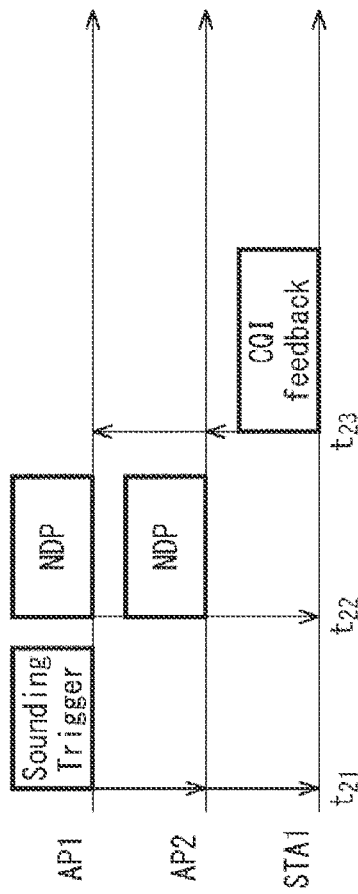
FIG. 3 is a timing chart for explaining an outline of sounding of the present disclosure.

More specifically, in a case where a plurality of wireless base stations is configured to be able to transmit NDP-A frames and NDP frames at a coordinated and synchronized timing, the processing is as illustrated in the timing chart in FIG. 3.

That is, at time t21, the wireless base station AP1 transmits the Sounding Trigger frame that describes the transmission timing and transmission parameters of the NDP frame to the wireless base station AP2 and the terminal device STA1.

Here, the wireless base station AP2 and the terminal device STA1 receive the Sounding Trigger frame and recognize the transmission timing and the transmission parameters of the NDP frame.

That is, the wireless base station AP2 and the terminal device STA1 recognize the transmission timing and transmission stream of the NDP frame of the wireless base stations AP1, AP2 on the basis of the Sounding Trigger frame, and recognize the transmission method of the CQI feedback frame transmitted by the terminal device STA1.

At time t22, the wireless base stations AP1, AP2 transmit the NDP frames in their respective transmission streams at the transmission timing specified by the Sounding Trigger frame.

Here, the terminal device STA1 receives the NDP frame transmitted in respective transmission streams of the wireless base stations AP1, AP2 at the transmission timing specified by the Sounding Trigger frame, and measures each CQI.

At time t23, the terminal device STA1 generates a CQI feedback frame including the CQI which is the measurement result, and transmits the CQI feedback frame by the transmission method specified by the Sounding Trigger frame.

Here, the wireless base stations AP1, AP2 receive the transmitted CQI feedback frames, derive the optimum transfer function for the transmission path to the terminal device STA1 on the basis of each CQI, and realize the optimum beamforming to the terminal device STA1.

Figure 4:
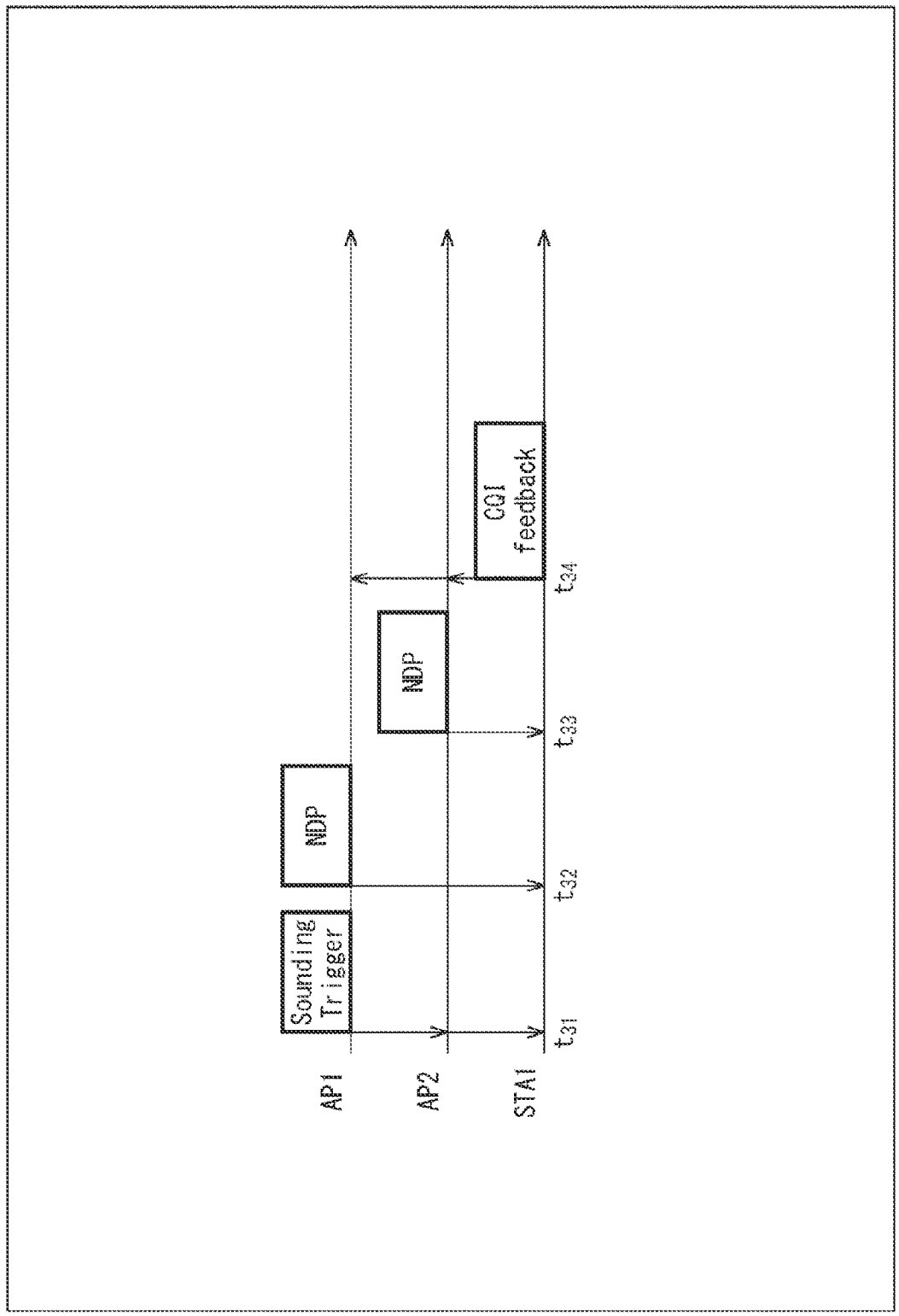
FIG. 4 is a timing chart for explaining an outline of sounding of the present disclosure.

Furthermore, in a case where a plurality of wireless base stations is configured not to be able to transmit NDP-A frames or NDP frames at a coordinated and synchronized timing, that is, a plurality of wireless base stations is each configured to transmit NDP-A frames or NDP frames at different timings, the processing is as illustrated in the timing chart in FIG. 4.

That is, at time t31, the wireless base station AP1 transmits the Sounding Trigger frame that describes the transmission time and transmission parameters of the NDP frame to the wireless base station AP2 and the terminal device STA1.

Here, the wireless base station AP2 and the terminal device STA1 receive the Sounding Trigger frame and recognize the transmission timing and the transmission parameters (transmission stream and the like) of the NDP frame.

That is, the wireless base station AP2 and the terminal device STA1 recognize the transmission timing and transmission stream of the NDP frame of each of the wireless base stations AP1, AP2, and recognize the transmission method of the CQI feedback frame transmitted by the terminal device STA1.

At time t32, the wireless base station AP1 transmits the NDP in the specified transmission stream at the transmission timing specified by the Sounding Trigger frame.

Here, the terminal device STA1 receives the NDP transmitted in the specified transmission stream from the wireless base station AP1 at the transmission timing specified by the Sounding Trigger frame, and measures the CQI of the wireless base station AP1.

At time t33, the wireless base station AP2 transmits the NDP in the specified transmission stream at the transmission timing specified by the Sounding Trigger frame.

Here, the terminal device STA1 receives the NDP transmitted in the specified transmission stream from the wireless base station AP2 at the transmission timing specified by the Sounding Trigger frame, and measures the CQI of the wireless base station AP2.

At time t34, the terminal device STA1 generates a CQI feedback frame including the CQIs which are the measurement results of each of the wireless base stations AP1, AP2, and transmits the CQI feedback frame in the transmission stream specified by the Sounding Trigger frame.

Here, the wireless base stations AP1, AP2 receive the transmitted CQI feedback frames, derive the optimum transfer function for the transmission path to the terminal device STA1 on the basis of each CQI, and realize the optimum beamforming to the terminal device STA1.

In any case, by the above processing, it is possible to transmit the transmission timing and the transmission parameters of the NDP frame to the wireless base station as a slave and the terminal device in one Sounding Trigger frame without transmitting a trigger frame each time the NDP frame is transmitted, so that the CQI can be quickly collected in the terminal device STA1.

Furthermore, since the transmission timing of the NDP frame of each wireless base station can be individually set by the Sounding Trigger frame, even in a case where a plurality of wireless base stations is configured not to be able to transmit NDP-A frames or NDP frames at the same coordinated and synchronized timing, sounding can be realized.

2. First Embodiment

Figure 5:
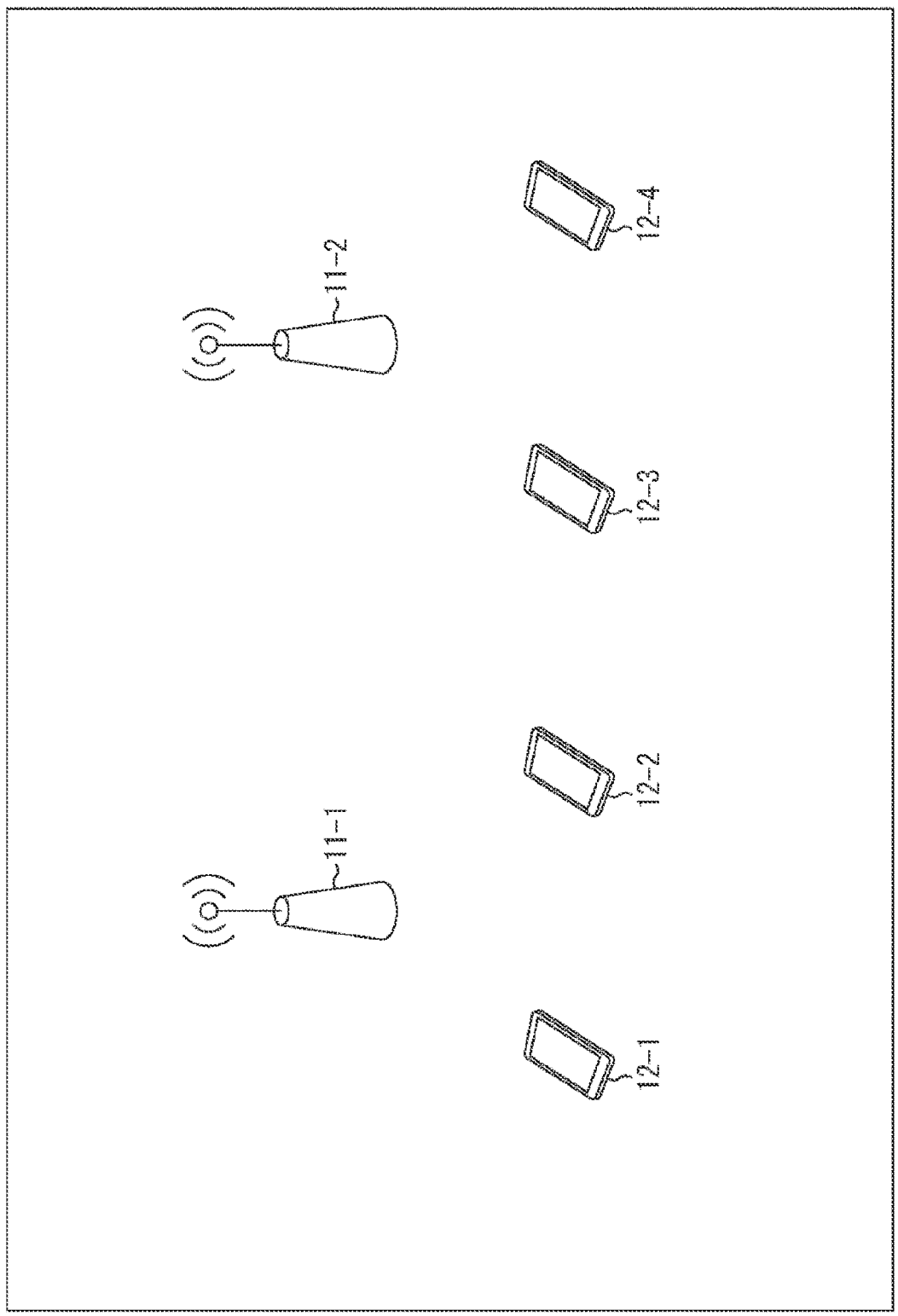
FIG. 5 is a diagram for explaining a configuration example of a communication system of the present disclosure.

Next, a configuration example of a first embodiment of the communication system of the present disclosure will be described with reference to FIG. 5.

The communication system of the present disclosure includes wireless base stations 11-1, 11-2 and terminal devices 12-1 to 12-4.

Note that the wireless base stations 11-1, 11-2 and the terminal devices 12-1 to 12-4 are simply referred to as wireless base station 11 and the terminal device 12 unless it is necessary to distinguish them. Furthermore, the configuration in the communication system of FIG. 5 is an example, and the number of wireless base stations 11 may be other than two, and similarly, the number of terminal devices 12 may be other than four.

The wireless base stations 11-1, 11-2 function as so-called access points, and transmit NDP frames, which are sounding frames, to the terminal devices 12-1 to 12-4.

Then, the wireless base stations 11-1, 11-2 receive the CQI feedback frame for the NDP frame from the terminal devices 12-1 to 12-4, obtain a transfer function for each transmission path, and realize the optimum beamforming.

The terminal devices 12-1 to 12-4 are, for example, smartphones or the like, and receive NDP frames, which are sounding frames from the wireless base stations 11-1, 11-2, measure the CQI, generate a CQI feedback frame including the CQI that is a measurement result, and return the CQI feedback frame.

The terminal devices 12-1, 12-2 communicate via the beamformed transmission path realized by the wireless base stations 11-1, 11-2 according to the CQI feedback frame.

<Configuration Example of Wireless Base Station>

Next, a configuration example of the wireless base station 11 will be described with reference to the block diagram in FIG. 6.

The wireless base station 11 includes a control unit 31, a power supply unit 32, a communication unit 33, and antennas 34-1 to 34-n.

The control unit 31 includes a processor and a memory, and controls the entire operation of the wireless base station 11.

More specifically, the control unit 31 generates a Sounding Trigger frame as described later, and controls the communication unit 33 to transmit the Sounding Trigger frame to another wireless base station 11 as a slave and the terminal device 12.

Furthermore, the control unit 31 controls the communication unit 33 to transmit the NDP frame to the terminal device 12.

Moreover, the control unit 31 controls the communication unit 33 to receive the CQI feedback frame transmitted from the terminal device 12 and including the measurement result of the CQI measured when the NDP frame is received, and thereby, sounding is realized.

Then, the control unit 31 controls the communication unit 33 on the basis of the CQI feedback that is the result of the sounding, to perform beamforming based on the optimum transfer function, and realizes the optimum communication with the terminal device 12.

Note that the control unit 31 may perform at least part of the operation on behalf of the wireless control unit 51 of the communication unit 33.

Furthermore, the power supply unit 32 includes a battery power supply or a fixed power supply, and supplies power to the entire wireless base station 11.

The communication unit 33 is controlled by the control unit 31 and executes various communication processing.

More specifically, the communication unit 33 includes a wireless control unit 51, a data processing unit 52, a modulation and demodulation unit 53, a spatial signal processing unit 54, wireless interface units 55-1 to 55-n, amplifier units 56-1 to 56-n, and a channel estimation unit 57.

The wireless interface units 55-1 to 55-n, the amplifier units 56-1 to 56-n, the channel estimation unit 57, and the antennas 34-1 to 34-n form one set, and it is sufficient that one or more sets are included as a component.

Furthermore, the functions of the amplifier units 56-1 to 56-n may be included in the wireless interface units 55-1 to 55-n.

The data processing unit 52 generates a packet for wireless transmission from the data at the time of transmission when data is input from the upper layer, performs processing such as adding a header or error detection code for media access control (MAC), and outputs the processed data to the modulation and demodulation unit 53.

Furthermore, on the contrary, when receiving an input from the modulation and demodulation unit 53, the data processing unit 52 performs processing such as analyzing a MAC header, detecting a packet error, or reorder processing, and outputs the processed data to the upper layer of its own protocol.

The wireless control unit 51 transmits and receives information to and from each unit.

Furthermore, the wireless control unit 51 performs parameter setting in the modulation and demodulation unit 53, parameter setting in the spatial signal processing unit 54, packet scheduling in the data processing unit 52, parameter setting in the wireless interface units 55-1 to 55-n and amplifier units 56-1 to 56-n, and transmission power control.

At the time of transmission, the modulation and demodulation unit 53 performs encoding, interleaving, and modulation on the input data from the data processing unit 52 on the basis of the encoding method and the modulation method set by the wireless control unit 51 to generate a data symbol stream, and outputs the data symbol stream to the spatial signal processing unit 54.

Furthermore, the modulation and demodulation unit 53 performs the opposite processing on the input from the spatial signal processing unit 54 at the time of reception, and outputs the data to the data processing unit 52 or the wireless control unit 51.

At the time of transmission, the spatial signal processing unit 54 performs signal processing for spatial separation, on the input from the modulation and demodulation unit 53 as necessary, and outputs the obtained one or more transmission symbol streams to each of the wireless interface units 55-1 to 55-n.

Furthermore, at the time of reception, the spatial signal processing unit 54 performs signal processing on the received symbol stream input from each of the wireless interface units 55-1 to 55-n, spatially decomposes the stream as necessary, and outputs the result to the modulation and demodulation unit 53.

The channel estimation unit 57 calculates complex channel gain information of a propagation path from a preamble portion and a training signal portion of the input signal from each of the wireless interface units 55-1 to 55-n.

The calculated complex channel gain information is used for demodulation processing in the modulation and demodulation unit 53 and spatial processing in the spatial signal processing unit 54 via the wireless control unit 51.

The wireless interface units 55-1 to 55-n convert the input from the spatial signal processing unit 54 into an analog signal at the time of transmission, perform filtering, up-conversion to the carrier frequency, and phase control, and output the result to the antennas 34-1 to 34-n or the amplifier units 56-1 to 56-n.

Furthermore, the wireless interface units 55-1 to 55-n perform the opposite processing on the input from the antenna or the amplifier unit at the time of reception, and output data to the spatial signal processing unit 54 and the channel estimation unit 57.

At the time of transmission, the amplifier units 56-1 to 56-n amplify the analog signal input from the wireless interface units 55-1 to 55-n to a predetermined power, and output the result to the antennas 34-1 to 34-n.

Furthermore, the amplifier units 56-1 to 56-n amplify the signal input from the antennas 34-1 to 34-n to a predetermined power at the time of reception, and output the signal to the wireless interface units 55-1 to 55-n.

At least part of at least one of the function at the time of transmission or the function at the time of reception of the amplifier units 56-1 to 56-n may be included in the wireless interface unit 55-1 to 55-n.

Furthermore, at least part of at least one of the function at the time of transmission or the function at the time of reception of the amplifier units 56-1 to 56-n may be a component outside the communication unit.

<Configuration Example of Terminal Device>

Next, a configuration example of the terminal device 12 will be described with reference to the block diagram in FIG. 7.

The terminal device 12 includes a control unit 71, a power supply unit 72, a communication unit 73, and antennas 74-1 to 74-m, and has a configuration in which the components respectively correspond to the control unit 31, the power supply unit 32, the communication unit 33, and the antennas 34-1 to 34-n in the wireless base station 11 that have been described with reference to FIG. 6.

The control unit 71 controls the communication unit 73 to receive the Sounding Trigger frame and the NDP frame, and measures the CQI when receiving the NDP frame.

Then, the control unit 31 generates a CQI feedback frame including the measurement result of the CQI, controls the communication unit 73, and transmits the CQI feedback frame to the wireless base station 11.

The communication unit 73 is controlled by the control unit 71 and executes various communication processing.

More specifically, the communication unit 73 includes a wireless control unit 91, a data processing unit 92, a modulation and demodulation unit 93, a spatial signal processing unit 94, wireless interface units 95-1 to 95-n, amplifier units 96-1 to 96-n, and a channel estimation unit 97.

Figure 6:
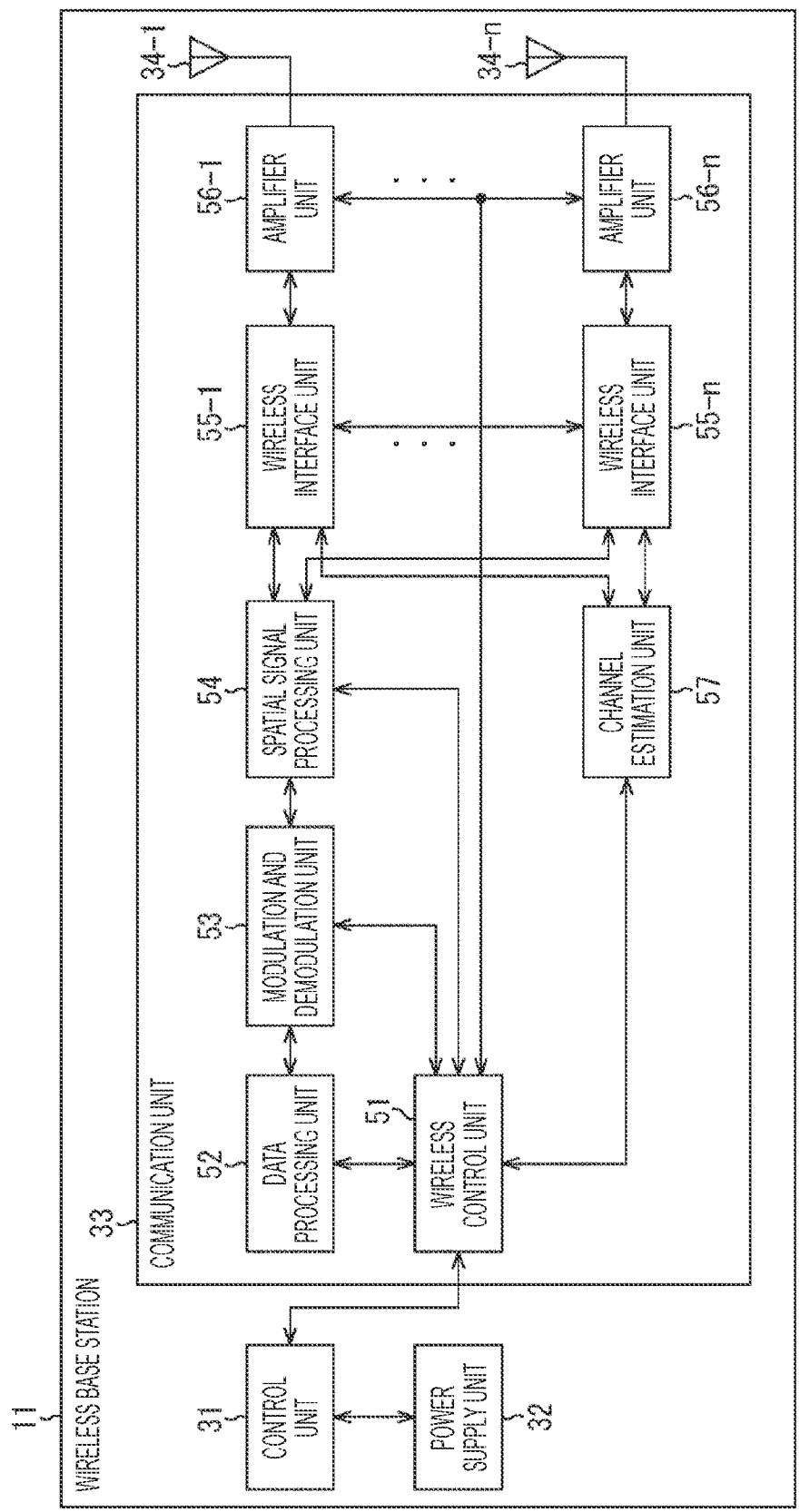
FIG. 6 is a diagram for explaining a configuration example of a wireless base station of FIG. 5.

Note that the wireless control unit 91, the data processing unit 92, the modulation and demodulation unit 93, the spatial signal processing unit 94, the wireless interface units 95-1 to 95-n, the amplifier units 96-1 to 96-n, and the channel estimation unit 97 have configurations corresponding to the wireless control unit 51, the data processing unit 52, the modulation and demodulation unit 53, the spatial signal processing unit 54, the wireless interface units 55-1 to 55-n, the amplifier units 56-1 to 56-n, and the channel estimation unit 57, which have been described with reference to FIG. 6, and therefore, the description thereof will be omitted.

Furthermore, since the power supply unit 72 and the antennas 74-1 to 74-m have the same configurations as the power supply unit 32 and the antennas 34-1 to 34-m that have been described with reference to FIG. 6, the description thereof will be omitted.

<Configuration Example of Sounding Trigger Frame>

Next, a configuration example of the Sounding Trigger frame will be described with reference to FIG. 8.

The Sounding Trigger frame includes, from the left in the drawing, Frame Control of 2 octets, Duration of 2 octets, Receiver Address (RA) of 6 octets, Transmitter Address (TA) of 6 octets, Sounding Dialog Token of 1 octet, Num of AP Info of 1 octet, n pieces of AP Info in units of 2 octets, n pieces of STA Info in units of 4 octets, and Frame Check Sequence (FCS) of 4 octets.

The Frame Control is information that specifies the type of frame, and here, information that specifies that it is a Sounding Trigger frame is stored.

In the Duration, information indicating the transmission period of the radio wave for transmitting the Sounding Trigger frame is stored.

Information of the receiving side address is stored in the RA, and information of the transmitting side address is stored in the TA.

The Sounding Dialog Token includes Reserved (reserved area) of 1 bit, HE of 1 bit, and Sounding Dialog Token Number of 6 bits, from the left in the drawing.

The HE stores information for discriminating modes between the high efficiency (HE) mode and a very high throughput (VHT) mode.

The Sounding Dialog Token Number stores the number information for associating the Sounding Trigger frame with the corresponding NDP.

The Num of AP Info stores information indicating the number of pieces of AP Info.

The AP Info includes BSS Color of 6 bits, NDP transmission period of 6 bits, and NDP transmission stream of 6 bits, from the left in the drawing.

The BSS color stores an identifier that identifies the wireless base station 11.

The NDP transmission period stores information for specifying the transmission timing of the NDP frame, and stores, for example, information on the time from the reception of the Sounding Trigger frame to the reception of the NDP frame.

The NDP transmission stream stores information (spatial information) associated with the transmission stream when transmitting an NDP frame, and stores, for example, information indicating the row of the mapping matrix of the long training field (LTF) of the NDP frame to be used.

Here, the long training field (LTF) is a field included in the NDP frame and storing information for performing synchronization processing for receiving a signal.

For example, in a case where the wireless base stations 11-1, 11-2 transmit NDP frames using two antennas each for sounding, the mapping matrix of the LTF in the NDP frames is represented by a matrix of 4 rows×4 columns as illustrated in FIG. 9, for example.

Note that, the mapping matrix of FIG. 9 is a matrix including four rows and four columns in which the top row is 1, −1, 1, 1 from the left, the second row from the top is 1, 1, −1, 1 from the left, the third row from the top is 1, 1, 1, −1 from the left, and the bottom row is −1, 1, 1, 1 from the left.

Here, a configuration in which the wireless base stations 11-1, 11-2 each transmit NDP frames using two antennas corresponds to a case where one wireless base station 11 transmits NDP frames using four antennas.

In a case of one wireless base station 11, the mapping matrix can be assigned to antennas 1, 2, 3, 4 from the upper row to transmit NDP frames separately for each antenna.

As similar to this, by notifying the rows in the AP Info NDP transmission stream of the Sounding Trigger frame with the top two lines assigned to the wireless base station 11-1 and the bottom two lines assigned to the wireless base station 11-2, even when NDP frames are transmitted at the same timing, the NDP frames can be transmitted separately in different transmission streams for each antenna of the wireless base stations 11-1, 11-2.

The STA Info includes AID 11 of 11 bits, Partial BW Info of 14 bits, Feedback Type and Ng of 2 bits, Disambiguation of 1 bit, Codebook Size of 1 bit, and Nc of 3 bits.

The AID 11 stores an identifier that identifies the terminal device 12.

The Partial BW Info stores information that specifies the resource unit (RU) range used when transmitting the CQI feedback.

The Feedback Type And Ng stores the CQI feedback method and information that specifies the Ng as to how many adjacent subcarrier matrix information should be transmitted as the same value (single user (SU) or multi user (MU), Ng=4, 16).

The Disambiguation stores information for preventing ambiguity of the legacy terminal.

The Codebook Size stores information that specifies the quantization resolution of the CQI feedback value.

The Nc stores information on the number of streams used to calculate the CQI feedback signal.

The Frame Check Sequence (FCS) stores information on the error correction code.

Figure 8:
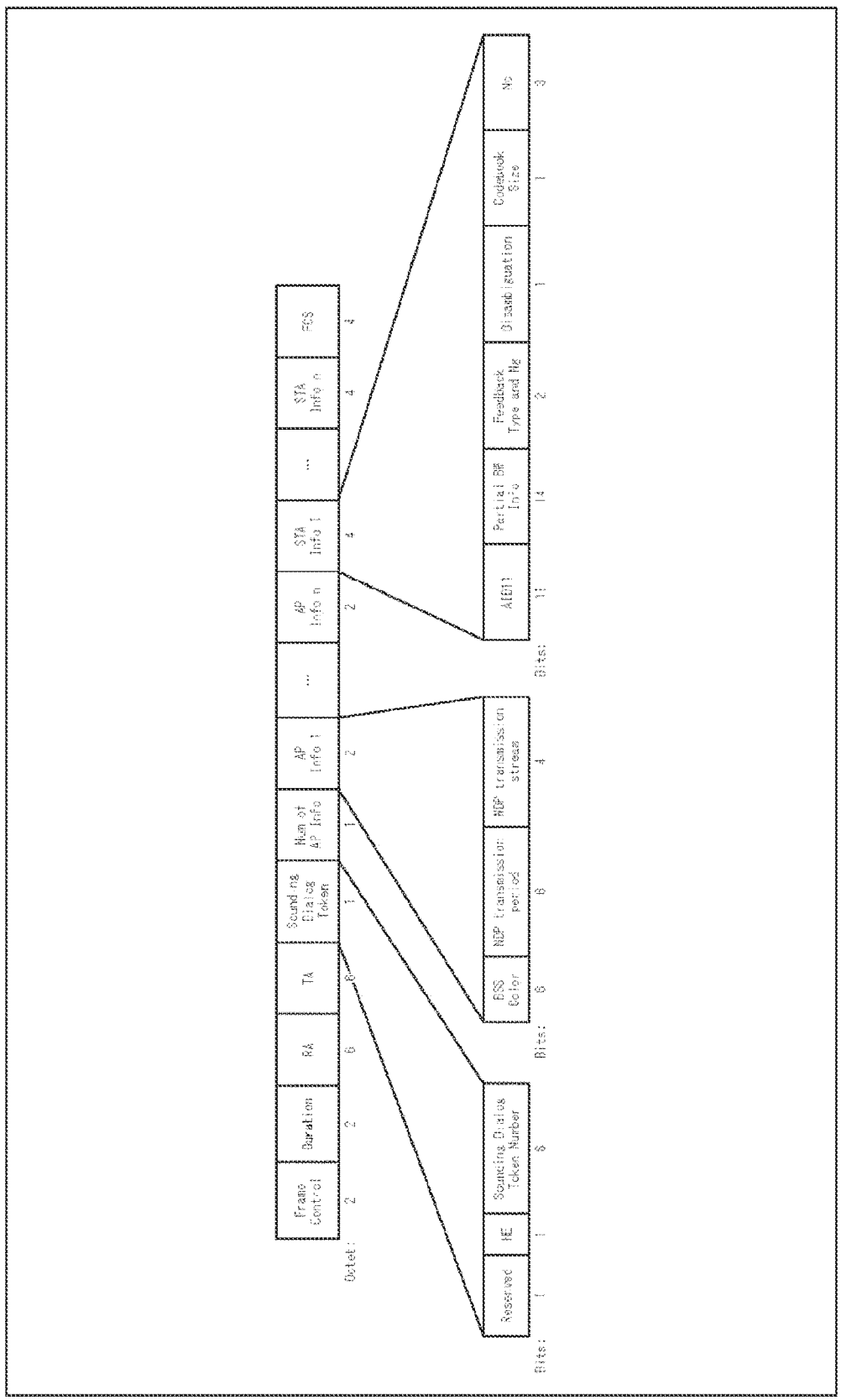
FIG. 8 is a diagram for explaining a configuration example of a Sounding Trigger frame.
Figure 10:
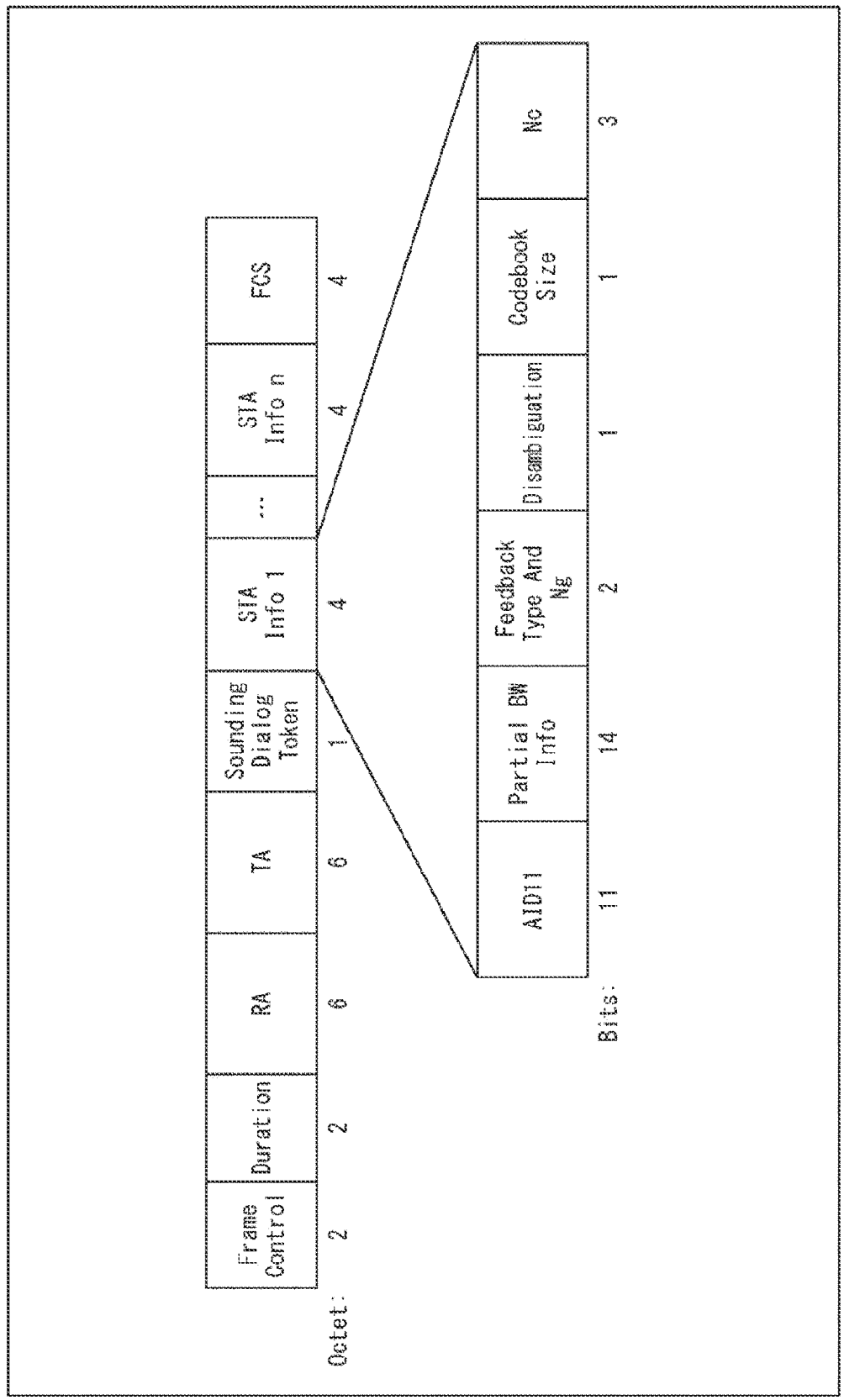
FIG. 10 is a diagram for explaining a configuration example of NDP-A.

The Sounding Trigger frame illustrated in FIG. 8 has a configuration in which the Num of AP Info and n pieces of AP Info are added to the conventional NDP-A frame illustrated in FIG. 10.

That is, the Sounding Trigger frame has a configuration similar to the conventional NDP-A frame by the configuration as illustrated in FIG. 8, and moreover, stores information that specifies the transmission timing and transmission stream when transmitting the individual NDP frames of the wireless base station 11.

Furthermore, the Sounding Trigger frame is transmitted from the wireless base station 11-1 as a master to the wireless base station 11 as a slave and the terminal devices 12-1 to 12-4.

Therefore, the wireless base stations 11-1, 11-2 and the terminal devices 12-1 to 12-4 individually recognize the transmission timing and the transmission stream at which the NDP frame is transmitted in both the wireless base stations 11-1, 11-2 in units of the wireless base station 11.

Therefore, the wireless base stations 11-1, 11-2 can cooperate to transmit NDP frames at the same timing, or the wireless base stations 11-1, 11-2 can independently transmit NDP frames at different timings.

Note that, regarding whether or not the wireless base stations 11-1, 11-2 can cooperate with each other to transmit NDP frames at the same time, the wireless base station 11-1 may exchange capability information with the wireless base station 11-2 and the terminal device 12 in advance, and determine whether or not the wireless base stations 11-1, 11-2 can cooperate with each other to transmit NDP frames at the same time, from the capability information of the wireless base station 11-2 and the terminal device 12. Furthermore, if the wireless base stations 11-1, 11-2 can cooperate to transmit NDP frames at the same time, it is possible to select whether to transmit NDP frames at the same time or to transmit NDP frames individually at independent timings. Therefore, even if the wireless base stations 11-1, 11-2 can cooperate to transmit NDP frames at the same time, the capability information may be used to determine whether or not to transmit NDP frames at the same time.

Furthermore, the wireless base station 11 as a master may be any of the wireless base stations 11-1, 11-2, and it is sufficient that, when it is time for each to require sounding, the wireless base station 11 transmits the Sounding Trigger frame as a master.

For example, each of the wireless base stations 11-1, 11-2 may be made to repeatedly sound at a predetermined cycle, and in this case, it is sufficient that, when the sounding is started at each of the wireless base stations 11-1, 11-2, the wireless base stations transmit the Sounding Trigger frame as a master wireless base station 11.

Communication Processing in First Embodiment

Figure 11:
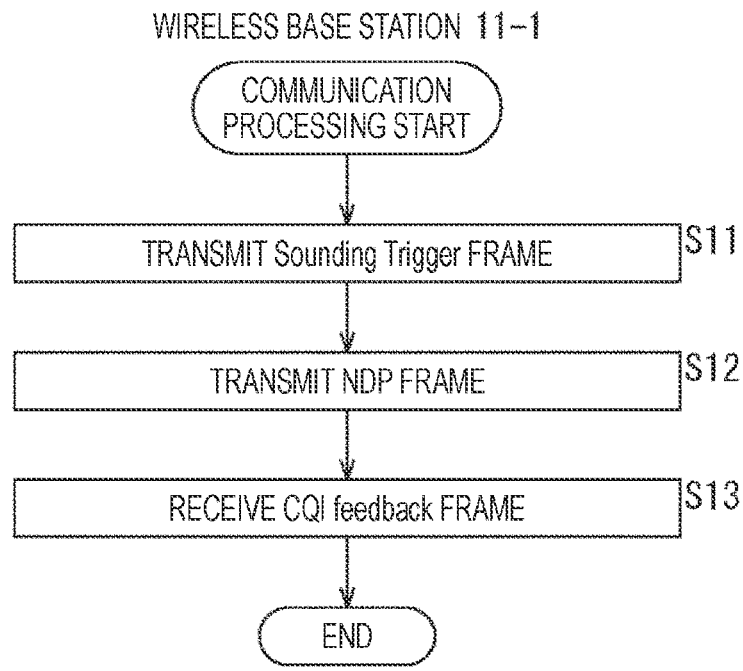
FIG. 11 is a flowchart for explaining communication processing by a wireless base station as a master in a first embodiment.
Figure 12:
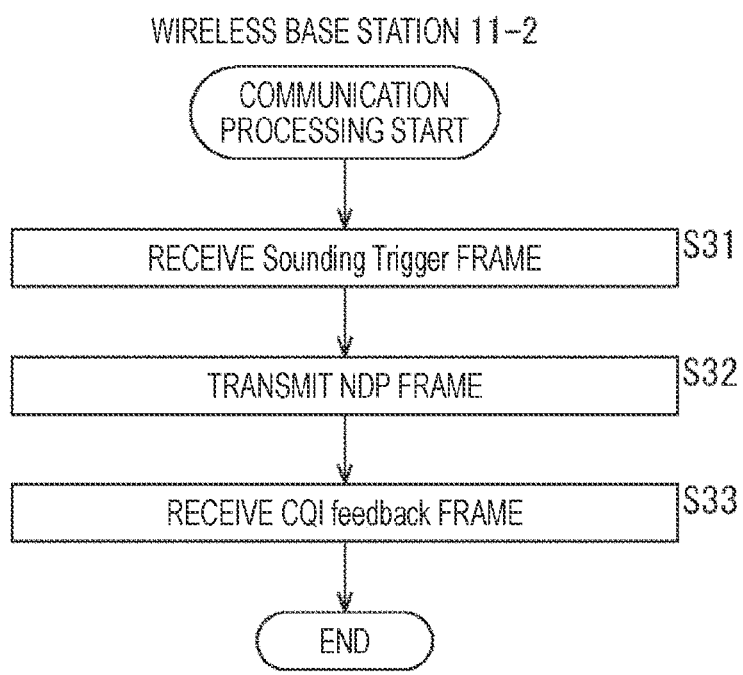
FIG. 12 is a flowchart for explaining communication processing by a wireless base station as a slave in the first embodiment.

Next, the communication processing according to the first embodiment will be described with reference to the flowcharts in FIGS. 11 to 13.

Furthermore, in the explanation of the communication processing in the first embodiment, the timing will also be described with reference to the timing charts in FIGS. 3 and 4.

Here, an example of communication processing in a communication system including wireless base stations 11-1, 11-2 and a terminal device 12 of any one of the terminal devices 12-1 to 12-4 will be described.

Note that, in the timing charts of FIGS. 3 and 4, the wireless base station AP1 corresponds to the wireless base station 11-1, the wireless base station AP2 corresponds to the wireless base station 11-2, and the terminal device STA1 corresponds to the terminal device 12.

Furthermore, in the explanation of the communication processing in the first embodiment, for example, as an operating subject, the control unit 31 of the wireless base station 11-1 is referred to as the control unit 31-1, and the control unit 31 of the wireless base station 11-2 is referred to as the control unit 31-2, and in the other configurations, whether the control unit is of the wireless base station 11-1 or the wireless base station 11-2 is distinguished by adding "-" in a similar manner and by the following codes.

Moreover, the operations of the communication units 33, 73 of the wireless base station 11 and the terminal device 12 are only described as being controlled by the control units 31, 71, respectively, to transmit or receive a predetermined frame, and the detailed description of the operation will be omitted.

In step S11 (FIG. 11), the control unit 31-1 of the wireless base station 11-1 as a master generates a Sounding Trigger frame, and controls the communication unit 33-1 to transmit the Sounding Trigger frame to the wireless base station 11-2 as a slave and the terminal device 12.

In step S31 (FIG. 12), the control unit 31-2 of the wireless base station 11-2 controls the communication unit 33-2 to receive the Sounding Trigger frame transmitted from the wireless base station 11-1.

In step S51 (FIG. 13), the control unit 71 of the terminal device 12 controls the communication unit 73 to receive the Sounding Trigger frame transmitted from the wireless base station 11-1.

That is, by the processing of the above Steps S11, S31, and S51, the processing illustrated at time t21 in FIG. 3 or time t31 in FIG. 4 is realized.

In Step S12 (FIG. 11), the control unit 31-1 of the wireless base station 11-1 generates an NDP frame, and controls the communication unit 33-1 to transmit the NDP frame to the terminal device 12 at the transmission timing specified by the AP Info that specifies own wireless base station 11 and in the transmission stream specified by the AP Info, in the Sounding Trigger frame.

In Step S32 (FIG. 12), the control unit 31-2 of the wireless base station 11-2 generates an NDP frame, and controls the communication unit 33-2 to transmit the NDP frame to the terminal device 12 at the transmission timing specified by the AP Info that specifies own wireless base station 11 and in the transmission stream specified by the AP Info, in the Sounding Trigger frame.

In Step S52 (FIG. 13), the control unit 71 of the terminal device 12 determines whether or not a plurality of wireless base stations 11-1, 11-2 cooperates with each other to transmit NDP frames at the same timing, on the basis of the AP Info of the Sounding Trigger frame.

In Step S52, in a case where a plurality of wireless base stations 11-1, 11-2 cooperates with each other to transmit NDP frames at the same timing, the processing proceeds to step S53.

In step S53, the control unit 71 of the terminal device 12 controls the communication unit 73 to receive the NDP frames transmitted from the wireless base stations 11-1, 11-2 in the specified transmission stream at the specified transmission timing, and measures the CQI.

That is, in a case where a plurality of wireless base stations 11-1, 11-2 cooperates with each other to transmit NDP frames at the same timing, processing of Steps S12

(FIG. 11) and S32 (FIG. 12) is performed simultaneously at time t22 in FIG. 3 so that the terminal device 12 simultaneously receives the NDP frames from the wireless base stations 11-1, 11-2, and measures the CQI simultaneously.

On the other hand, in Step S52, in a case where a plurality of wireless base stations 11-1, 11-2 independently transmits NDP frames at different timings, the processing proceeds to Step S55.

In step S55, the control unit 71 of the terminal device 12 controls the communication unit 73 to receive the NDP frame transmitted in the specified transmission stream at the specified transmission timing from the wireless base station 11-1, and measures the CQI.

In step S56, the control unit 71 of the terminal device 12 controls the communication unit 73 to receive the NDP frame transmitted in the specified transmission stream at the specified transmission timing from the wireless base station 11-2, and measures the CQI.

That is, in a case where a plurality of wireless base stations 11-1, 11-2 independently transmits NDP frames at different timings, as illustrated in FIG. 4, for example, processing of Step S12 (FIG. 11) is performed at time t32 so that the terminal device 12 receives the NDP frame from the wireless base station 11-1 and measures the CQI of the wireless base station 11-1.

Thereafter, as illustrated in FIG. 4, for example, the processing of Step S32 (FIG. 12) is performed at time t33 so that the terminal device 12 receives the NDP frame from the wireless base station 11-2 and measures the CQI of the wireless base station 11-2.

In this case, the terminal device 12 receives the NDP frames from the wireless base stations 11-1, 11-2 individually and independently at different timings, and measures each CQI.

Here, since the transmission timings at which the NDP frames is transmitted from the wireless base stations 11-1, 11-2 are different from each other, the NDP frame may be transmitted from the wireless base stations 11-1, 11-2 in the same transmission stream.

Accordingly, in this case, if any specific transmission stream is determined, the information on the NDP transmission stream of the AP Info in the Sounding Trigger frame described with reference to FIG. 8 may be omitted or deleted, and may be information that specifies a specific transmission stream.

In Step S54 (FIG. 13), the control unit 71 of the terminal device 12 generates a CQI feedback frame on the basis of the CQI of the wireless base stations 11-1, 11-2, controls the communication unit 73 to transmit the CQI feedback frame to the wireless base stations 11-1, 11-2 by the specified transmission method at the timing after the reception of the NDP frame transmitted at the last of the information on the Sounding Trigger frame.

In Step S13 (FIG. 11), the control unit 31-1 of the wireless base station 11-1 controls the communication unit 33-1 to receive the CQI feedback frame transmitted from the terminal device 12.

In Step S33 (FIG. 12), the control unit 31-2 of the wireless base station 11-2 controls the communication unit 33-2 to receive the CQI feedback frame transmitted from the terminal device 12.

By the above processing, as illustrated at time t23 in FIG. 3 or time t34 in FIG. 4, a CQI feedback frame is transmitted from the terminal device 12 to the wireless base stations 11-1, 11-2, and the wireless base stations 11-1, 11-2 receive the CQI feedback frame.

Furthermore, the wireless base stations 11-1, 11-2 can realize the optimum beamforming for the terminal device 12 by setting the transfer function on the basis of the CQI in the received CQI feedback frame.

Moreover, by the series of processing, it is possible to transmit information on the transmission timing and the transmission stream of the NDP frame to the wireless base station 11-2 as a slave and the terminal device 12 in one Sounding Trigger frame without transmitting a trigger frame each time the NDP frame is transmitted, so that the CQI of the wireless base stations 11-1, 11-2 can be quickly collected in the terminal device 12.

Furthermore, since the transmission timing of the NDP frame of each wireless base station 11 can be individually set by the Sounding Trigger frame, even in a case where a plurality of wireless base stations 11-1, 11-2 is configured not to be able to transmit NDP-A frames or NDP frames at the coordinated and synchronized timing, sounding can be realized.

As a result, it is possible to shorten the time required for collecting sounding information for a plurality of wireless base stations in the terminal device and suppress deterioration of following accuracy.

Note that, in the above, an example has been described in which the terminal device 12 transmits the CQI feedback frame by a method by which any of the wireless base stations 11-1, 11-2 can receive the CQI feedback frame, but the CQI feedback frame may be transmitted to any one of the wireless base stations 11-1, 11-2.

In this case, of the wireless base stations 11-1, 11-2, one wireless base station 11 that has received the CQI feedback frame transmits the CQI feedback frame to the other wireless base station 11.

Whether the terminal device 12 transmits the CQI feedback frame to both wireless base stations 11-1, 11-2, or to either of them is specified by the Feedback Type and Ng of the STA Info in the Sounding Trigger frame described above with reference to FIG. 8.

3. Application Example of First Embodiment

In the above, an example has been described in which the Sounding Trigger frame is identified by the Frame Control described with reference to FIG. 8. However, in the Frame Control, a configuration may be applied such that an identifier as the NDP-A frame is registered, and information of 2 bits that is the Reserved of the Sounding Dialog Token and the HE can be used to identify a frame as the Sounding Trigger frame as illustrated in FIG. 8 as a normal NDP-A frame and an extended NDP-A frame.

That is, regarding the Reserved, in a case of being 0, it is assumed that the frame is a normal VHT NDP Announcement frame when the HE is 0, and it is assumed that the frame is a HE NDP Announcement frame when HE is 1.

Then, in a case where the Reserved is 1, it is assumed that the frame is a Sounding Trigger frame when the HE is 0, and it is set to the reserved state when the HE is 1.

Thereby, when reading the Sounding Trigger frame, in the Frame Control, by recognizing as an NDP-A frame, and then, reading the Sounding Dialog Token, recognition can be made as to whether it is a VHT NDP Announcement frame, a HE NDP Announcement frame, or a Sounding Trigger frame.

Furthermore, in the above, an example has been described in which the BSS Color is used as the information for identifying the wireless base station 11 in the AP Info in the Sounding Trigger frame of FIG. 8, but as long as the wireless base station 11 can be identified, the information may be other information, and may be BSSID, for example.

4. Second Embodiment

In the above, sounding by the plurality of wireless base stations 11 for one terminal device 12 has been described. However, the plurality of wireless base stations 11 may perform sounding for a plurality of terminal devices 12.

In a case where the plurality of wireless base stations 11 performs sounding for the plurality of terminal devices 12, a Beamforming Report Poll (BFRP) Trigger frame is newly defined in addition to the Sounding Trigger frame.

The BFRP Trigger frame is a frame that is transmitted from the wireless base station 11-1 as a master to the plurality of terminal devices 12 after all wireless base stations 11 transmit NDP frames. The BFRP Trigger frame includes information instructing a method of returning the CQI feedback frame to each of the plurality of terminal devices 12.

Figure 15:
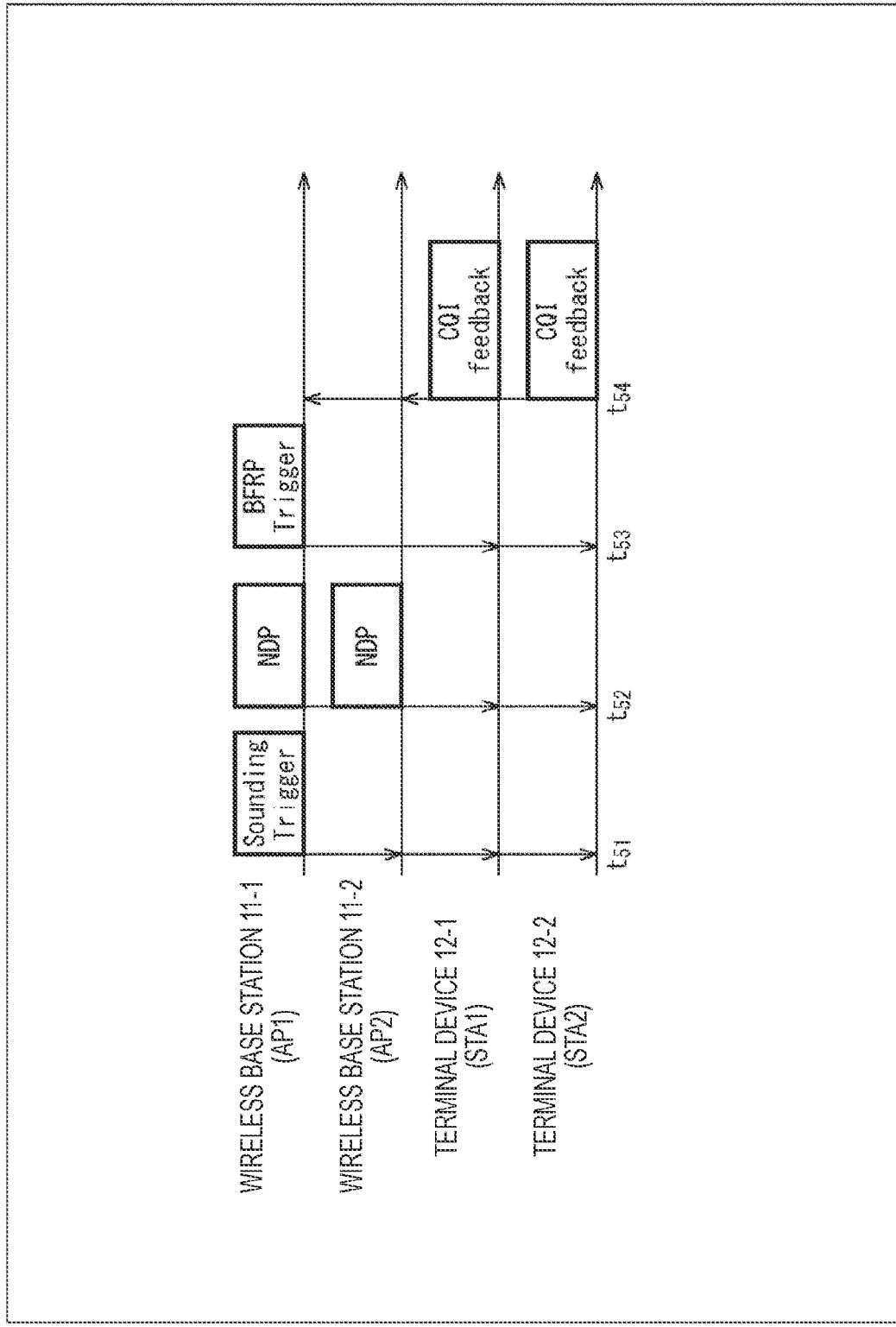
FIG. 15 is a timing chart for explaining sounding in a second embodiment.

More specifically, in a case where a plurality of wireless base stations is configured to be able to transmit NDP frames at a coordinated and synchronized timing, and two terminal devices 12-1, 12-2 are used as the terminal device 12, the processing is as illustrated in the timing chart in FIG. 15.

That is, at time t51, the wireless base station 11-1 as a master transmits the Sounding Trigger frame that describes the transmission timing and transmission parameters of the NDP frame to the wireless base station 11-2 and the terminal devices 12-1, 12-2.

Here, the wireless base station 11-2 and the terminal devices 12-1, 12-2 receive the Sounding Trigger frame and recognize the transmission timing and the transmission parameters of the NDP frame.

At time t52, the wireless base stations 11-1, 11-2 each transmit the NDP frames in the specified transmission streams at the transmission timing specified by the Sounding Trigger frame.

Here, the terminal devices 12-1, 12-2 receive the NDP transmitted in each transmission stream of the wireless base stations 11-1, 11-2, and measure each CQI.

At time t53, the wireless base station 11-1 as a master transmits a BFRP Trigger frame that describes the transmission parameters of the CQI feedback frame to the terminal devices 12-1, 12-2.

At this time, the terminal devices 12-1, 12-2 receive the BFRP Trigger frame that describes the transmission parameters of the CQI feedback frame.

At time t54, the terminal devices 12-1, 12-2 generate a CQI feedback frame including the CQI which is the measurement result on the basis of the returning method described in the BFRP Trigger frame, and transmit the CQI feedback frame to the wireless base stations 11-1, 11-2.

Here, the wireless base stations 11-1, 11-2 receive the transmitted CQI feedback frames, derive the optimum transfer function for the transmission path to the terminal devices 12-1, 12-2 on the basis of each CQI, and realize the optimum beamforming to the terminal devices 12-1, 12-2.

Figure 16:
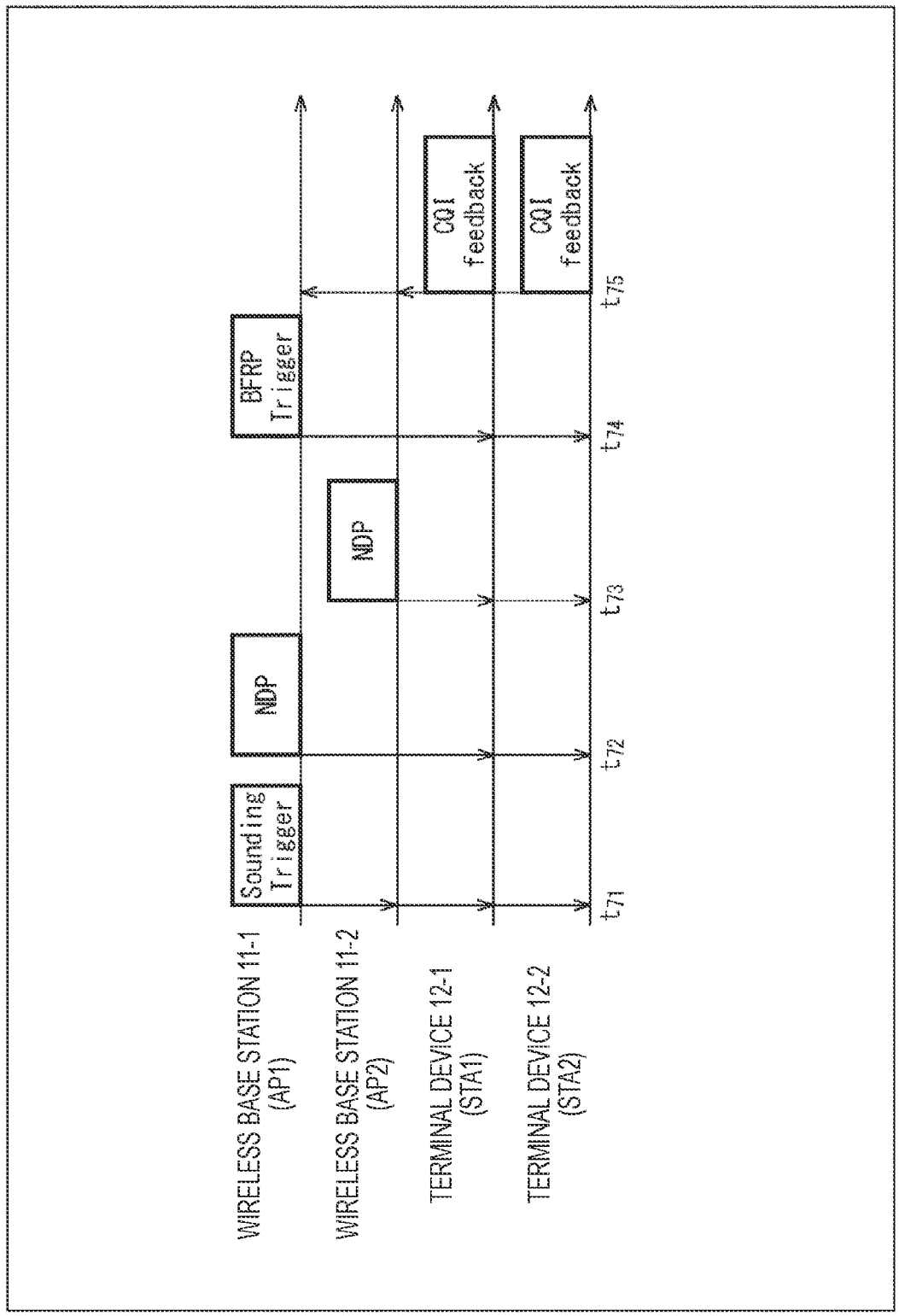
FIG. 16 is a timing chart for explaining sounding in the second embodiment.

Furthermore, in a case where a plurality of wireless base stations 11-1, 11-2 is configured not to be able to transmit NDP frames at a coordinated and synchronized timing, that is, a plurality of wireless base stations 11-1, 11-2 is each configured to transmit NDP frames at different timings, the processing is as illustrated in the timing chart in FIG. 16.

That is, as illustrated in the timing chart in FIG. 16, at time t71, the wireless base station 11-1 transmits the Sounding Trigger frame that describes the transmission timing and transmission parameters of the NDP frame to the wireless base station 11-2 and the terminal devices 12-1, 12-2.

Here, the wireless base station 11-2 and the terminal devices 12-1, 12-2 receive the Sounding Trigger frame and recognize the transmission timing and the transmission parameters of the NDP frame.

At time t72, the wireless base station 11-1 transmits the NDP in the specified transmission stream at the transmission timing specified by the Sounding Trigger frame.

Here, the terminal devices 12-1, 12-2 receive the NDP frame transmitted in the specified transmission stream from the wireless base station 11-1 at the transmission timing specified by the Sounding Trigger frame, and measure the CQI of the wireless base station 11-1.

At time t73, the wireless base station 11-2 transmits the NDP frame in the specified transmission stream at the transmission timing specified by the Sounding Trigger frame.

Here, the terminal devices 12-1, 12-2 receive the NDP frame transmitted in the specified transmission stream from the wireless base station 11-2 at the transmission timing specified by the Sounding Trigger frame, and measure the CQI of the wireless base station 11-2.

At time t74, the wireless base station 11-1 as a master transmits a BFRP Trigger frame that describes the returning method of the CQI feedback frame to the terminal devices 12-1, 12-2.

At this time, the terminal devices 12-1, 12-2 receive the BFRP Trigger frame that describes the returning method of the CQI feedback frame.

At time t75, the terminal devices 12-1, 12-2 generate a CQI feedback frame including the CQI which is the measurement result on the basis of the returning method described in the BFRP Trigger frame, and transmit the CQI feedback frame to the wireless base stations 11-1, 11-2.

Here, the wireless base stations 11-1, 11-2 receive the transmitted CQI feedback frames, derive the optimum transfer function for the transmission path to the terminal devices 12-1, 12-2 on the basis of each CQI, and realize the optimum beamforming to the terminal devices 12-1, 12-2.

<Configuration Example of BFRP Trigger Frame>

Figure 17:
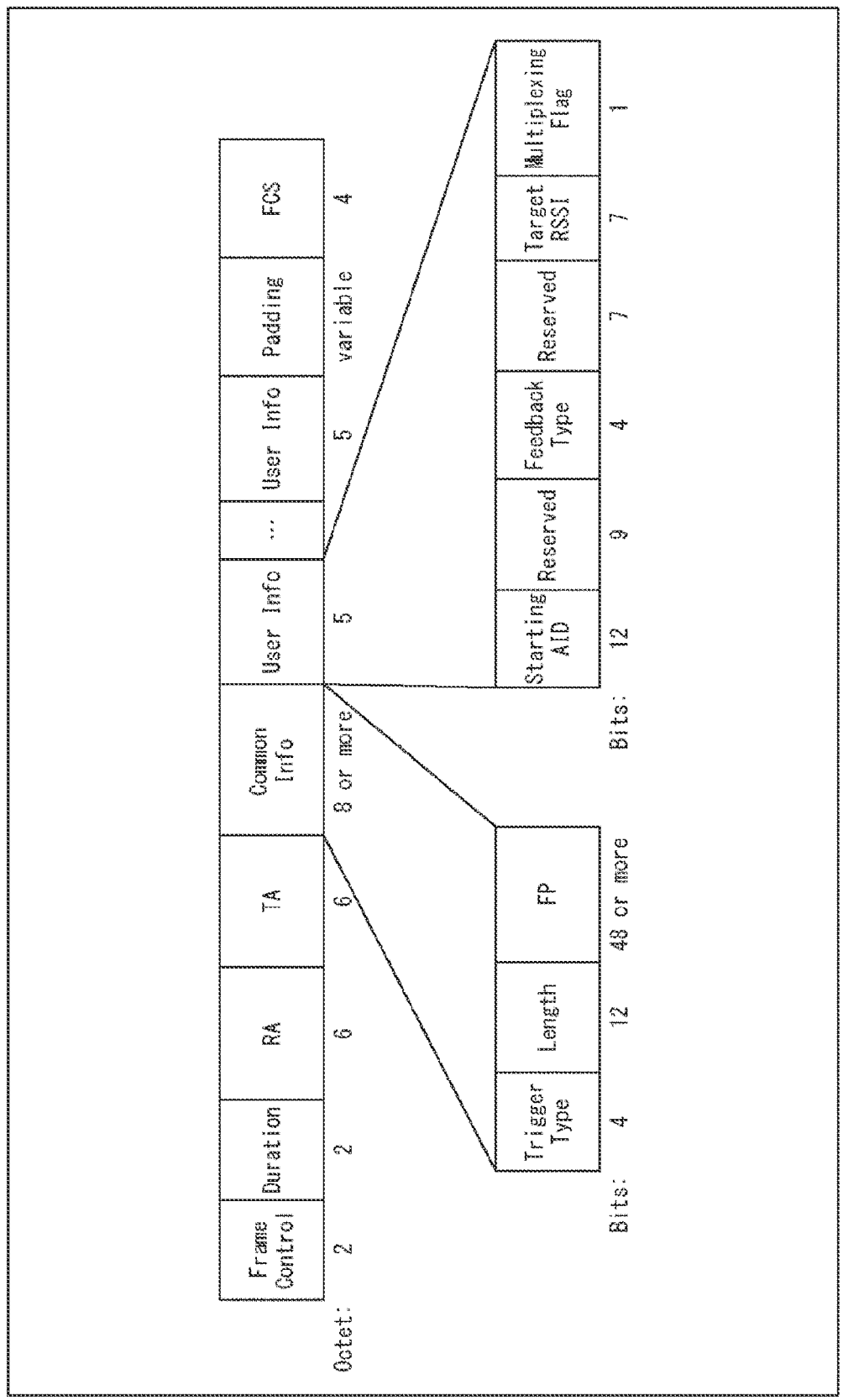
FIG. 17 is a diagram for explaining a configuration example of a BFRP Trigger frame.

Next, a configuration example of the BFRP Trigger frame will be described with reference to FIG. 17.

The BFRP Trigger frame includes Frame Control of 2 octets, Duration of 2 octets, Receiver Address (RA) of 6 octets, Transmitter Address (TA) of 6 octets, Common Info of 8 (or more) octets, User Info of n pieces in units of 5 octets, variable length Padding, and Frame Check Sequence (FCS) of 4 octets.

Of these, the Frame Control, the Duration, the RA, the TA, and the FCS have similar configurations to the configurations in the Sounding Trigger frame of FIG. 8, and therefore, their description will be omitted. Furthermore, since Padding does not have a function, the description thereof will be omitted.

The Common Info includes Trigger Type of 4 bits, Length of 12 bits, and FP of 48 (more) bits.

The Trigger Type stores information indicating the type of Trigger, and BFRP is specified in the Trigger Type.

The Length stores information of the data length of the Common Info.

The FP (Feedback Parameter) stores the CQI feedback transmission parameters common to all terminal devices 12.

The User Info includes Starting AID of 12 bits, Reserved of 9 bits, Feedback Type of 4 bits, Reserved of 7 bits, Target RSSI of 7 bits, and Multiplexing Flag of 1 bit.

The Starting AID stores identification information that identifies the terminal device 12 specified to return the CQI feedback.

The Feedback Type stores information that specifies the returning method in the CQI feedback frame unique to the terminal device 12 specified by the Starting AID. The specific information that specifies the returning method of the CQI feedback is, for example, the Resource Request Type that requests feedback only from the terminal device 12 that has the data to be transmitted to the wireless base station 11.

The Target RSSI stores the target RSSI value of the CQI feedback signal. The terminal device 12 controls the transmission power on the basis of this numerical value.

The Multiplexing Flag stores a flag indicating whether or not a plurality of terminal devices 12 returns the CQI feedback using the same subcarrier.

Communication Processing in Second Embodiment

Figure 18:
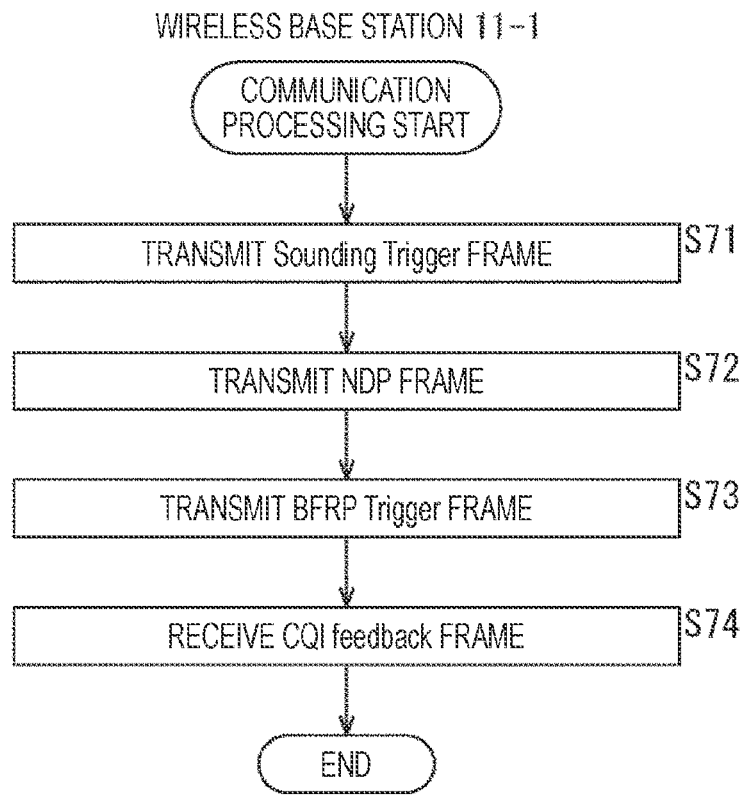
FIG. 18 is a flowchart for explaining communication processing by a wireless base station as a master in the second embodiment.
Figure 19:
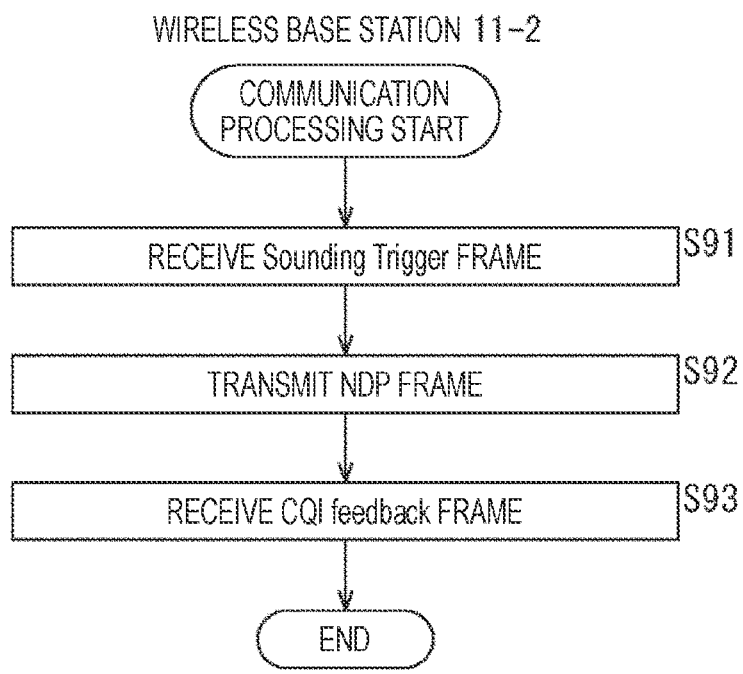
FIG. 19 is a flowchart for explaining communication processing by a wireless base station as a slave in the second embodiment.
Figure 20:
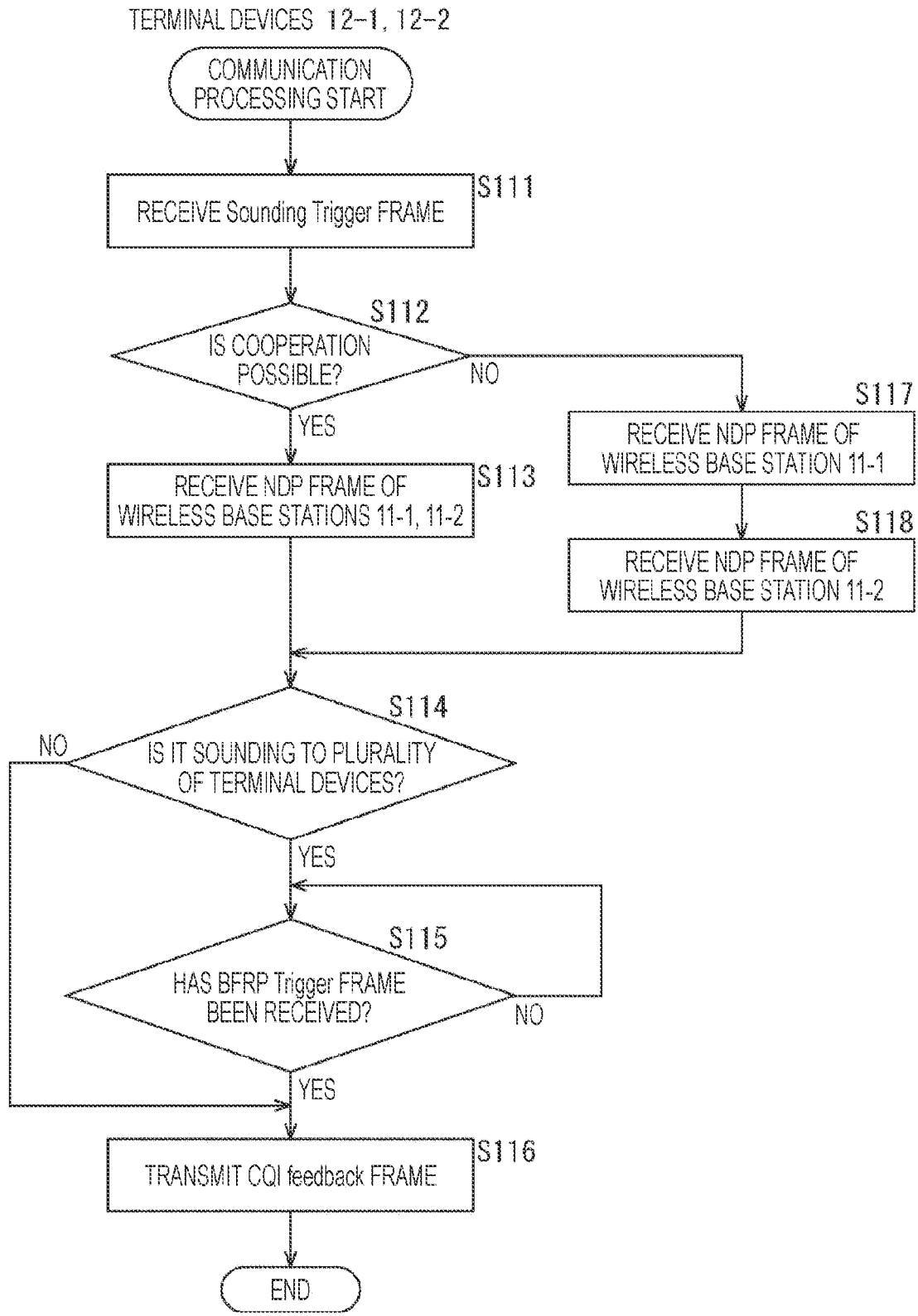
FIG. 20 is a flowchart for explaining communication processing by a terminal device in the first embodiment.

Next, the communication processing according to the second embodiment will be described with reference to the flowcharts in FIGS. 18 to 20. Furthermore, in the explanation of the communication processing in the second embodiment, the timing will also be described with reference to the timing charts in FIGS. 15 and 16.

In Step S71 (FIG. 18), the control unit 31-1 of the wireless base station 11-1 as a master generates a Sounding Trigger frame, and controls the communication unit 33-1 to transmit the Sounding Trigger frame to the wireless base station 11-2 as a slave and the terminal devices 12-1, 12-2.

In Step S91 (FIG. 19), the control unit 31-2 of the wireless base station 11-2 controls the communication unit 33-2 to receive the Sounding Trigger frame transmitted from the wireless base station 11-1.

In Step S111 (FIG. 20), the control units 71-1, 71-2 of the terminal devices 12-1, 12-2 control the communication units 73-1, 73-2 to receive the Sounding Trigger frame transmitted from the wireless base station 11-1.

That is, by the processing of the above Steps S71, S91, and S111, the processing illustrated at time t51 in FIG. 15 or time t71 in FIG. 16 is realized.

In Step S72 (FIG. 18), the control unit 31-1 of the wireless base station 11-1 generates an NDP frame, and controls the communication unit 33-1 to transmit the NDP frame to the terminal device 12 at the transmission timing specified by the AP Info that specifies own wireless base station 11 and in the specified transmission stream, in the Sounding Trigger frame.

In Step S92 (FIG. 19), the control unit 31-2 of the wireless base station 11-2 generates an NDP frame, and controls the communication unit 33-2 to transmit the NDP frame to the terminal device 12 at the transmission timing specified by the AP Info that specifies own wireless base station 11 and in the specified transmission stream, in the Sounding Trigger frame.

In Step S112 (FIG. 20), the control units 71-1, 71-2 of the terminal devices 12-1, 12-2 determine whether or not a plurality of wireless base stations 11-1, 11-2 cooperates with each other to transmit NDP frames at the same timing, on the basis of the AP Info of the Sounding Trigger frame.

In Step S112, in a case where a plurality of wireless base stations 11-1, 11-2 cooperates with each other to transmit NDP frames at the same timing, the processing proceeds to step S113.

In step S113, the control units 71-1, 71-2 of the terminal devices 12-1, 12-2 control the communication units 73-1, 73-2, respectively, to receive the NDP frame transmitted from the wireless base stations 11-1, 11-2.

That is, in a case where a plurality of wireless base stations 11-1, 11-2 cooperates with each other to transmit NDP frames at the same timing, processing of Steps S72 (FIG. 18) and S92 (FIG. 19) is performed simultaneously at time t52 in FIG. 15 so that the terminal devices 12-1, 12-2 receive the NDP frames from the wireless base stations 11-1, 11-2 simultaneously and measure the CQI simultaneously.

On the other hand, in Step S112, in a case where a plurality of wireless base stations 11-1, 11-2 independently transmits NDP frames at different timings, the processing proceeds to Step S117.

In step S117, the control units 71-1, 71-2 of the terminal devices 12-1, 12-2 control the communication units 73-1, 73-2, respectively, to receive the NDP frame transmitted from the wireless base station 11-1.

In Step S118, the control units 71-1, 71-2 of the terminal devices 12-1, 12-2 control the communication units 73-1, 73-2, respectively, and receive the NDP frame transmitted from the wireless base station 11-2, and measure the CQI.

That is, in a case where a plurality of wireless base stations 11-1, 11-2 independently transmits NDP frames at different timings, as illustrated in FIG. 16, for example, processing of Step S72 (FIG. 18) is performed at time t72 so that each of the terminal devices 12-1, 12-2 receives the NDP frame from the wireless base station 11-1 and measures the CQI of the wireless base station 11-1.

Moreover, as illustrated in FIG. 16, for example, the processing of Step S92 (FIG. 19) is performed at time t73 so that each of the terminal devices 12-1, 12-2 receives the NDP frame from the wireless base station 11-2 and measures the CQI of the wireless base station 11-2.

That is, in this case, each of the terminal devices 12-1, 12-2 receives the NDP frames from the wireless base stations 11-1, 11-2 individually and independently at different timings, and measures each CQI.

In Step S114, the terminal devices 12-1, 12-2 determine whether or not sounding is performed for the plurality of terminal devices 12, on the basis of the STA Info of the Sounding Trigger frame.

Here, since sounding is performed for a plurality of terminal devices 12-1, 12-2, in Step S114, it is considered that sounding is performed for a plurality of terminal devices 12, and the processing proceeds to Step S115.

In Step S115, the control units 71-1, 71-2 of the terminal devices 12-1, 12-2 control the communication units 73-1, 73-2 to determine whether or not the BFRP Trigger frame transmitted from the wireless base station 11-1 as a master has been received, and similar processing is repeated until the BFRP Trigger frame is received.

On the other hand, in Step S73 (FIG. 18), the control unit 31-1 of the wireless base station 11-1 as a master generates a BFRP Trigger frame, and controls the communication unit 33-1 to transmit the BFRP Trigger frame to the terminal devices 12-1, 12-2.

By the above processing, as illustrated in time t53 in FIG. 15 or time t74 in FIG. 16, the BFRP Trigger frame is transmitted from the wireless base station 11-1 to the terminal devices 12-1, 12-2.

By the processing of Step S73, the BFRP Trigger frame is transmitted from the wireless base station 11-1 as a master, and the control units 71-1, 71-2 of the terminal devices 12-1, 12-2 control the communication units 73-1, 73-2, respectively, to receive the BFRP Trigger frame.

Therefore, in Step S115 (FIG. 20), it is considered that the BFRP Trigger frame has been received, and the processing proceeds to Step S116.

In Step S116, each of the terminal devices 12-1, 12-2 generates a CQI feedback frame from the CQI of the wireless base stations 11-1, 11-2 on the basis of the returning method specified in the received BFRP Trigger frame.

Then, the terminal devices 12-1, 12-2 control the communication units 73-1, 73-2, respectively, to transmit the CQI feedback frames to the wireless base stations 11-1, 11-2.

In Step S74 (FIG. 18), the control unit 31-1 of the wireless base station 11-1 controls the communication unit 33-1 to receive the CQI feedback frame transmitted from the terminal devices 12-1, 12-2.

In Step S93 (FIG. 19), the control unit 31-2 of the wireless base station 11-2 controls the communication unit 33-2 to receive the CQI feedback frames transmitted from the terminal devices 12-1, 12-2.

By the above processing, as illustrated at time t54 in FIG. 15 or time t75 in FIG. 16, a CQI feedback frame is transmitted from the terminal devices 12-1, 12-2 to the wireless base stations 11-1, 11-2, and the wireless base stations 11-1, 11-2 receive the CQI feedback frame.

Furthermore, each of the wireless base stations 11-1, 11-2 can realize the optimum beamforming for the terminal devices 12-1, 12-2 by setting the transfer function on the basis of the CQI in the received CQI feedback frame.

Note that, in a case where sounding has not been performed for a plurality of terminal devices 12 in Step S114, the processing of Step S115 is skipped.

Figure 13:
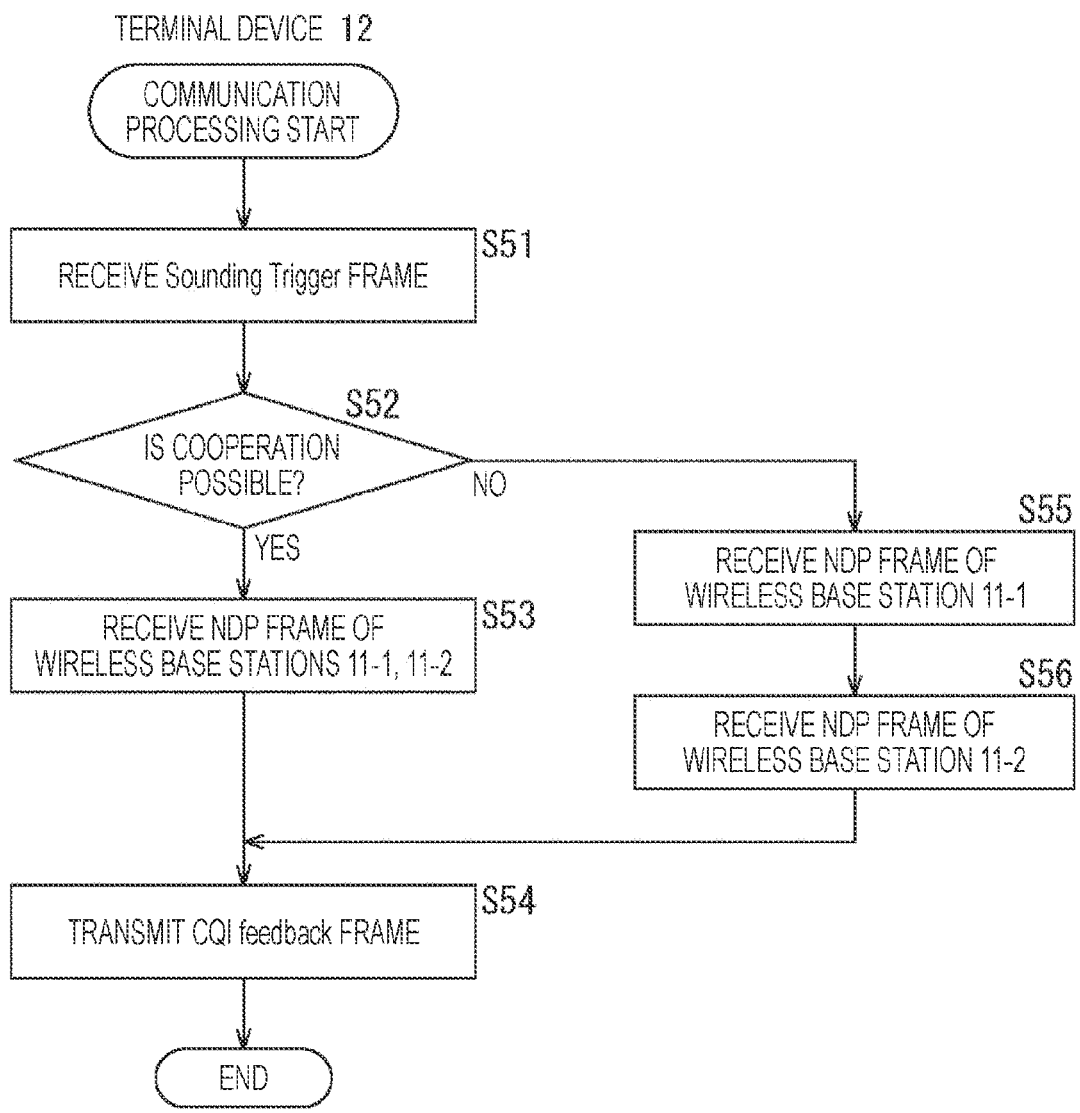
FIG. 13 is a flowchart for explaining communication processing by a terminal device in the first embodiment.

That is, in this case, since the sounding is processing performed on one terminal device 12, the processing of step S115 is skipped, and substantially, the sounding that has been described with reference to FIG. 13 is a similar processing to the communication processing performed for one terminal device 12.

As described above, by the series of processing, also for the plurality of terminal devices 12-1, 12-2, it is possible to transmit information on the transmission timing and the transmission stream of the NDP frame to the wireless base station 11-2 as a slave and the plurality of terminal devices 12-1, 12-2 in one Sounding Trigger frame without transmitting a trigger frame each time the NDP frame is transmitted, so that the CQI of the wireless base stations 11-1, 11-2 can be quickly collected in the terminal device 12.

Furthermore, since the transmission timing of the NDP frame of each wireless base station 11 can be individually set by the Sounding Trigger frame also for the plurality of terminal devices 12-1, 12-2, even in a case where a plurality of wireless base stations 11-1, 11-2 is configured not to be able to transmit NDP-A frames or NDP frames at the coordinated and synchronized timing, sounding can be realized.

Moreover, even if sounding is performed for a plurality of terminal devices 12 and CQI feedback frames are transmitted at the same timing, the wireless base station 11 can distinguish and receive the respective CQI feedback frames by a returning method specified by the BFRP Trigger frame.

Note that, in the above, the example has been described in which two terminal devices 12-1, 12-2 are used as the terminal device 12, but the terminal device 12 may be two or more, may be four of the terminal devices 12-1 to 12-4, or may be four or more. Furthermore, the wireless base station 11 may be two or more of the wireless base stations 11-1, 11-2.

In the above, an example has been described in which each of the terminal devices 12-1, 12-2 transmits the CQI feedback frame by a method by which any of the wireless base stations 11-1, 11-2 can receive the CQI feedback frame, but the CQI feedback frame may be transmitted to any one of the wireless base stations 11-1, 11-2.

In this case, of the wireless base stations 11-1, 11-2, one wireless base station 11 that has received the CQI feedback frame transmits the CQI feedback frame to the other wireless base station 11.

Whether each of the terminal devices 12-1, 12-2 transmits the CQI feedback frame to both wireless base stations 11-1, 11-2, or to either of them is specified by the Feedback Type of the User Info in the BFRP Trigger frame described above with reference to FIG. 17.

As a result, it is possible to shorten the time required for collecting sounding information for a plurality of wireless base stations in a plurality of terminal devices and suppress deterioration of following accuracy.

5. Example of Executing by Software

Incidentally, the series of processing described above can be also executed by hardware. However, the series of processing can also be executed by software. In a case of executing a series of processing by software, a program included in the software is installed from a recording medium to a computer incorporated in dedicated hardware, for example, a general-purpose computer that can execute various functions by installing various programs, or the like.

Figure 21:
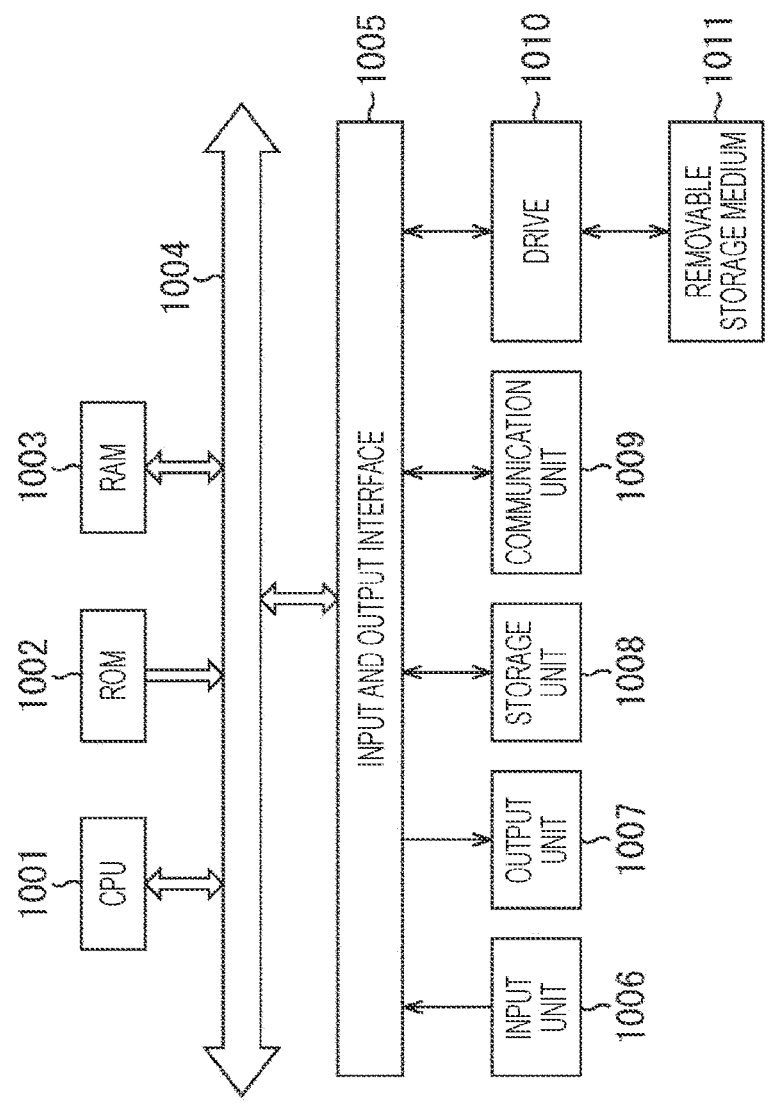
FIG. 21 is a diagram for explaining a configuration example of a general-purpose personal computer.

FIG. 21 illustrates a configuration example of a general-purpose computer. This personal computer has a built-in central processing unit (CPU) 1001. An input and output interface 1005 is connected to the CPU 1001 via a bus 1004. A read only memory (ROM) 1002 and a random access memory (RAM) 1003 are connected to the bus 1004.

The input and output interface 1005 is connected with an input unit 1006 including an input device such as a keyboard, or a mouse for inputting operation commands by the user, an output unit 1007 that outputs an image of a processing operation screen or a processing result to a display device, a storage unit 1008 including a hard disk drive or the like for storing programs and various data, and a communication unit 1009 including a local area network (LAN) adapter or the like and performing communication processing via a network typified by the Internet. Furthermore, the input and output interface 1005 is connected with a drive 1010 that reads and writes data with respect to a removable storage medium 1011 such as a magnetic disc (including a flexible disc), an optical disc (including compact disc-read only memory (CD-ROM) and a digital versatile disc (DVD)), a magneto-optical disc (including mini disc (MD)), or a semiconductor memory.

The CPU 1001 is read out from a program stored in the ROM 1002 or the removable storage medium 1011 such as a magnetic disc, an optical disc, a magneto-optical disc, or a semiconductor memory, is installed in the storage unit 1008, and executes various processing in accordance with a program loaded into the RAM 1003 from the storage unit 1008. Furthermore, the RAM 1003 appropriately stores also data or the like necessary for the CPU 1001 to execute various processing.

In the computer configured as described above, for example, the CPU 1001 loads the program stored in the storage unit 1008 into the RAM 1003 via the input and output interface 1005 and the bus 1004, and executes the program, so that the above-described series of processing is performed.

The program executed by the computer (CPU 1001) can be provided by being recorded on the removable storage medium 1011 as a package medium or the like, for example. Furthermore, the program can be provided via a wired or wireless transmission medium such as a local area network, the Internet, or digital satellite broadcasting.

In the computer, a program can be installed in the storage unit 1008 via the input and output interface 1005 by mounting the removable storage medium 1011 to the drive 1010. Furthermore, the program can be received by the communication unit 1009 via a wired or wireless transmission medium and installed in the storage unit 1008. In addition, the program can be installed in the ROM 1002 or the storage unit 1008 in advance.

Note that the program executed by the computer may be a program of processing in chronological order according to the order described in the present specification or may be a program of processing in parallel or at necessary timing such as when a call is made.

Figure 7:
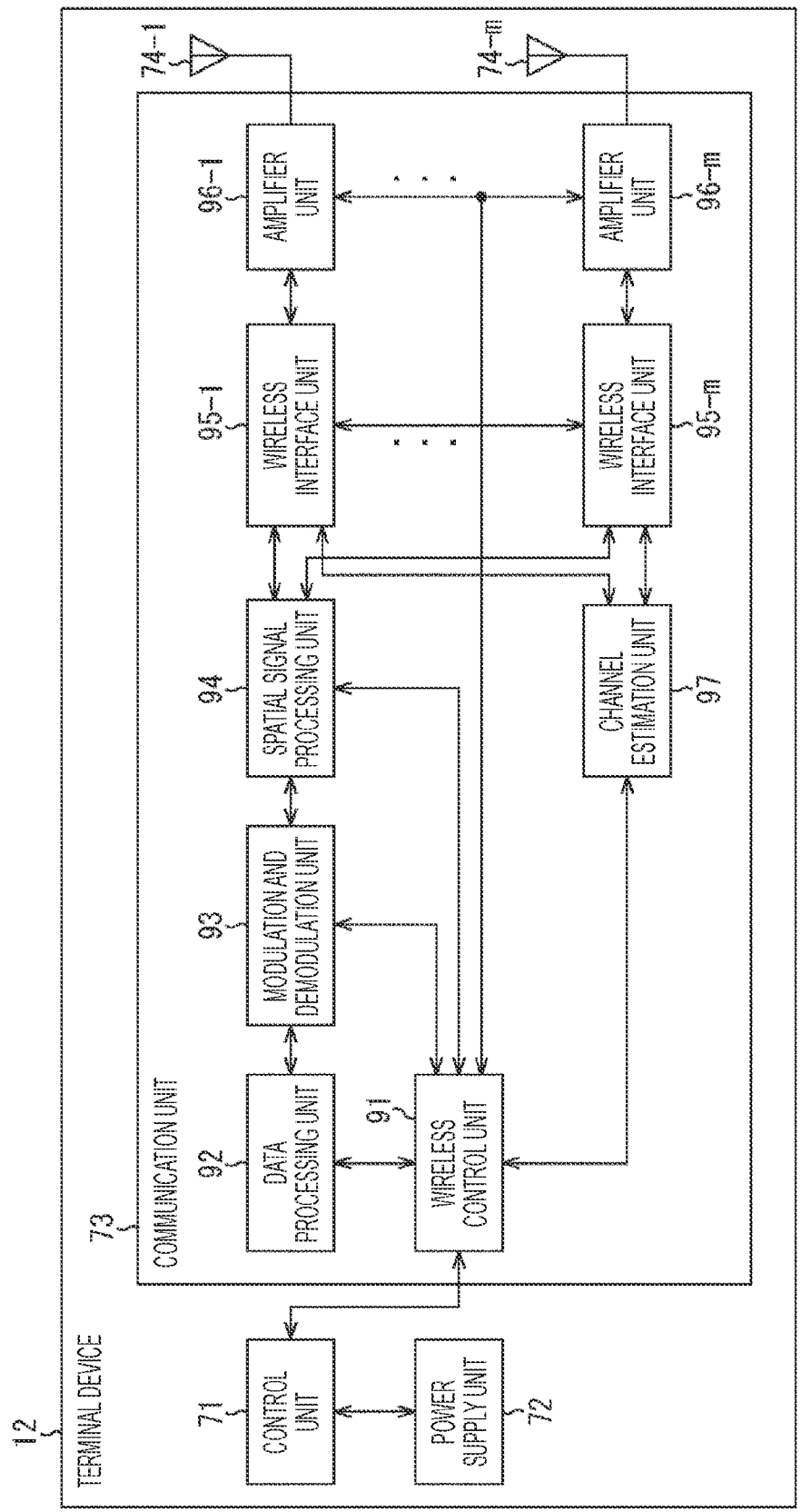
FIG. 7 is a diagram for explaining a configuration example of a terminal device of FIG. 5.

Note that the CPU 1001 in FIG. 21 realizes the functions of the control unit 31 in FIG. 6 and the control unit 71 in FIG. 7.

Furthermore, in this specification, a system means a set of a plurality of constituent elements (devices, modules (parts), or the like), and it does not matter whether or not all constituent elements are in the same casing. Therefore, a plurality of devices that is housed in separate housings and is connected via a network, and one device in which a plurality of modules is housed in one housing are both systems.

Note that the embodiments of the present disclosure are not limited to the above-described embodiments, and various modifications are possible without departing from the gist of the present disclosure.

For example, in the present disclosure, it is possible to adopt a configuration of cloud computing in which one function is shared by a plurality of devices via a network, and is collaboratively processed.

Furthermore, each step described in the above-described flowchart can be executed by one device or shared by a plurality of devices.

Moreover, in a case where a plurality of processing is included in one step, a plurality of processing included in the one step can be executed by one device or shared and executed by a plurality of devices.

Note that, the present disclosure can adopt the following configuration.

<1> A wireless base station including
   a control unit that performs control to transmit a start frame instructing another wireless base station to perform a channel measurement when performing a channel measurement with a terminal device.

<2> The wireless base station according to <1>,
   in which the start frame includes: identification information of the another wireless base station; and at least one of timing information or spatial information for transmitting, by the another wireless base station, a channel measurement frame that is a frame for a channel measurement.

<3> The wireless base station according to <2>,
   in which, in a case where the wireless base station and the another wireless base station transmit the channel measurement frame at the same timing, the start frame includes the timing information and the spatial information for transmitting the channel measurement frame by the another wireless base station at the same timing as a timing at which the wireless base station transmits the channel measurement frame.

<4> The wireless base station according to <2>,
   in which, in a case where the wireless base station and the another wireless base station do not transmit the channel measurement frame at the same timing, the start frame includes the timing information for transmitting the channel measurement frame by the another wireless base station at a different timing from a timing at which the wireless base station transmits the channel measurement frame.

<5> The wireless base station according to any one of <1> to <4>,
   in which the start frame includes information indicating a transmission method when the terminal device transmits a channel measurement result that is a result of the channel measurement, to the wireless base station, as transmission method information, and
   the control unit performs control to receive the channel measurement result transmitted from the terminal device on the basis of the transmission method information.

<6> The wireless base station according to <5>,
   in which in a case where the transmission method information is information instructing the terminal device to transmit the channel measurement result to any of the wireless base stations including the wireless base station,
      the control unit of the wireless base station to which the channel measurement result is transmitted from the terminal device performs control to receive the channel measurement result from the terminal device, and also transmit the channel measurement result that has been received, to the another wireless base station, and
      the control unit of the wireless base station to which the channel measurement result is transmitted from the another wireless base station performs control to receive the channel measurement result transmitted from the another wireless base station.

<7> The wireless base station according to <5>,
   in which, in a case where the transmission method information is information instructing the terminal device to transmit the channel measurement result to all of the wireless base stations including the wireless base station, the control unit of all of the wireless base stations including the wireless base station performs control to receive the channel measurement result transmitted from the terminal device.

<8> The wireless base station according to any one of <1> to <7>,
   in which, in a case where a channel measurement frame that is a frame for a channel measurement is transmitted to a plurality of terminal devices, after the channel measurement frame is transmitted from all of the wireless base stations including the wireless base station, the control unit performs control to transmit a returning frame instructing a returning method of a channel measurement result that is a result of the channel measurement, to the plurality of terminal devices, and performs control to receive the channel measurement result transmitted from the plurality of terminal devices by a returning method instructed by the returning frame.

<9> A wireless base station including
a control unit that performs control to receive a start frame transmitted from another wireless base station instructing to perform a channel measurement with a terminal device, and also performs control to transmit a channel measurement frame on the basis of at least one of timing information or spatial information for transmitting the channel measurement frame that is a frame for a channel measurement described in the start frame.

<10> The wireless base station according to <9>,
in which, in a case where the start frame includes the timing information and the spatial information for transmitting the channel measurement frame by the wireless base station at the same timing as a timing at which the another wireless base station transmits the channel measurement frame,
the control unit performs control to transmit the channel measurement frame at a same timing as a timing of the another wireless base station on the basis of the timing information and the spatial information for transmitting the channel measurement frame.

<11> The wireless base station according to <9>,
in which, in a case where the start frame includes the timing information for transmitting the channel measurement frame by the wireless base station at a different timing from a timing at which the another wireless base station transmits the channel measurement frame,
the control unit performs control to transmit the channel measurement frame at a different timing from the another wireless base station on the basis of the timing information for transmitting the channel measurement frame.

<12> The wireless base station according to any one of <9> to <11>,
in which the start frame includes information indicating a transmission method when the terminal device transmits a channel measurement result that is a result of the channel measurement, to the wireless base station, as transmission method information, and the control unit performs control to receive the channel measurement result transmitted from the terminal device on the basis of the transmission method information.

<13> The wireless base station according to <12>,
in which, in a case where the transmission method information is information instructing the terminal device to transmit the channel measurement result to any of the wireless base stations including the wireless base station,
the control unit of the wireless base station to which the channel measurement result is transmitted from the terminal device performs control to receive the channel measurement result from the terminal device, and also transmit the channel measurement result that has been received, to the another wireless base station, and
the control unit of the wireless base station to which the channel measurement result is transmitted from the another wireless base station performs control to receive the channel measurement result from the another wireless base station.

<14> The wireless base station according to <12>,
in which, in a case where the transmission method information is information instructing the terminal device to transmit the channel measurement result to all of the wireless base stations including the wireless base station,
the control unit of all of the wireless base stations including the wireless base station performs control to receive the channel measurement result from the terminal device.

<15> A terminal device including
a control unit that performs control to receive a start frame including, as transmission method information, information transmitted from a wireless base station and instructing to perform a channel measurement between the terminal device and the wireless base station and also instructing a transmission method when transmitting a channel measurement result that is a result of the channel measurement to the wireless base station,
performs control to receive a frame for a channel measurement transmitted from the wireless base station to perform the channel measurement on the basis of the start frame, and
performs control to transmit the channel measurement result to the wireless base station on the basis of the transmission method information.

<16> The terminal device according to <15>,
in which, in a case where the transmission method information is information instructing transmission of the channel measurement result to one of a plurality of the wireless base stations, the control unit performs control to transmit the channel measurement result to the instructed one of the wireless base stations.

<17> The terminal device according to <15>
in which, in a case where the transmission method information is information instructing transmission of the channel measurement result to all of a plurality of the wireless base stations, the control unit performs control to transmit the channel measurement result to all of a plurality of the wireless base stations.

<18> The terminal device according to <15>,
in which, in a case where a plurality of the wireless base station transmits a channel measurement frame that is a frame for the channel measurement at the same timing, the start frame includes timing information and spatial information for transmitting the channel measurement frame by the plurality of the wireless base stations at the same timing.

<19> The terminal device according to <15>,
in which, in a case where a plurality of the wireless base stations does not transmit a channel measurement frame that is a frame for the channel measurement at the same timing, the start frame includes timing information for transmitting the channel measurement frame by the plurality of the wireless base stations at different timings.

<20> The terminal device according to any one of <15> to <19>,
in which, in a case where a channel measurement frame that is a frame for the channel measurement is transmitted to a plurality of terminal devices, after the channel measurement frame is transmitted from all of the wireless base stations, a returning frame instructing a returning method of the channel measurement result is transmitted to the plurality of terminal devices from the wireless base station that has transmitted the start frame, and
the control unit performs control to receive the returning frame, and also performs control to transmit the channel measurement result to at least any of the all of the wireless base stations by the returning method instructed by the returning frame that has been received.

REFERENCE SIGNS LIST 11, 11-1, 11-2 Wireless base station
12, 12-1 to 12-4 Terminal device
31 Control unit
32 Power supply unit
33 Communication unit
34, 34-1 to 34-n Antenna
51 Wireless control unit
52 Data processing unit
53 Modulation and demodulation unit
54 Spatial signal processing unit
55, 55-1, 55-n Wireless interface unit
56, 56-1 to 56-n Amplifier unit
57 Channel estimation unit
71 Control unit
72 Power supply unit
73 Communication unit
74, 74-1 to 74-m Antenna
91 Wireless control unit
92 Data processing unit
93 Modulation and demodulation unit
94 Spatial signal processing unit
95, 95-1 to 95-n Wireless interface unit
96, 96-1 to 96-n Amplifier unit
97 Channel estimation unit

The invention claimed is:

1. A first wireless base station, comprising
a control unit configured to:
control transmission of a start frame to a second wireless base station at a time to perform a channel measurement with a terminal device; and
based on the transmission of the start frame, provide instruction to the second wireless base station to perform the channel measurement with the terminal device, wherein
the start frame includes timing information that indicates a first timing for transmission of a channel measurement frame by the second wireless base station to the terminal device, and
the channel measurement frame is a frame for the channel measurement.

2. The first wireless base station according to claim 1, wherein the start frame further includes:
identification information of the second wireless base station, and
spatial information for the transmission of the channel measurement frame by the second wireless base station to the terminal device.

3. The first wireless base station according to claim 2, wherein
based on transmission of the channel measurement frame by the first wireless base station and the transmission of the channel measurement frame by the second wireless base station at a same timing, the start frame includes the timing information and the spatial information for the transmission of the channel measurement frame by the second wireless base station at the first timing which is same as a second timing at which the first wireless base station is configured to transmit the channel measurement frame.

4. The first wireless base station according to claim 2, wherein
based on transmission of the channel measurement frame by the first wireless base station and the transmission of the channel measurement frame by the second wireless base station at a different timing, the start frame includes the timing information for the transmission of the channel measurement frame by the second wireless base station at the first timing which is different from a second timing at which the first wireless base station is configured to transmit the channel measurement frame.

5. The first wireless base station according to claim 1, wherein
the start frame further includes transmission method information that indicates a transmission method of transmission of a channel measurement result by the terminal device to the first wireless base station,
the channel measurement result is a result of the channel measurement, and
the control unit is further configured to control reception of the channel measurement result transmitted from the terminal device based on the transmission method information.

6. The first wireless base station according to claim 5, wherein
based on the transmission method information that indicates the terminal device to transmit the channel measurement result to one of the first wireless base station or the second wireless base station,
the control unit of the one of the first wireless base station or the second wireless base station to which the channel measurement result is transmitted from the terminal device is configured to:
control reception of the transmitted channel measurement result from the terminal device; and
control transmission of the received channel measurement result to the other of the first wireless base station or the second wireless base station, and
the control unit of the other of the first wireless base station or the second wireless base station to which the channel measurement result is transmitted from the one of the first wireless base station or the second wireless base station is configured to control reception of the channel measurement result transmitted from the one of the first wireless base station or the second wireless base station.

7. The first wireless base station according to claim 5, wherein
based on the transmission method information that indicates the terminal device to transmit the channel measurement result to both of the first wireless base station and the second wireless base station, the control unit of both of the first wireless base station and the second wireless base station is configured to control reception of the channel measurement result transmitted from the terminal device.

8. The first wireless base station according to claim 1, wherein
based on transmission of a channel measurement frame to a plurality of terminal devices after the channel measurement frame is transmitted from both of the first wireless base station and the second wireless base station, the control unit is further configured to:
control transmission of a returning frame to the plurality of terminal devices, wherein
the returning frame includes information that indicates a returning method of a channel measurement result, and
the channel measurement result is a result of the channel measurement; and control reception of the channel measurement result transmitted from the plurality of terminal devices based on the returning method included in the returning frame.

9. A first wireless base station, comprising
a control unit configured to:
control reception of a start frame transmitted from a second wireless base station, wherein based on the start frame, the second wireless base station instructs the first wireless base station to perform a channel measurement with a terminal device; and
control transmission of a channel measurement frame based on timing information included in the start frame, wherein
the timing information indicates a first timing for transmission of the channel measurement frame, and
the channel measurement frame is a frame for the channel measurement.

10. The first wireless base station according to claim 9, wherein
based on the start frame that includes the timing information and spatial information for the transmission of the channel measurement frame by the first wireless base station at the first timing which is same as a second timing at which the second wireless base station transmits the channel measurement frame,
the control unit is further configured to control the transmission of the channel measurement frame at the first timing which is same as the second timing of the second wireless base station.

11. The first wireless base station according to claim 9, wherein
based on the start frame that includes the timing information for the transmission of the channel measurement frame by the first wireless base station at the first timing which is different from a second timing at which the second wireless base station transmits the channel measurement frame,
the control unit is further configured to control the transmission of the channel measurement frame at the first timing which is different from the second timing of the second wireless base station.

12. The first wireless base station according to claim 9, wherein
the start frame further includes transmission method information that indicates a transmission method of transmission of a channel measurement result by the terminal device to the first wireless base station,
the channel measurement result is a result of the channel measurement, and
the control unit is further configured to control reception of the channel measurement result transmitted from the terminal device based on the transmission method information.

13. The first wireless base station according to claim 12, wherein
based on the transmission method information that indicates the terminal device to transmit the channel measurement result to one of the first wireless base station or the second wireless base station,
the control unit of the one of the first wireless base station or the second wireless base station to which the channel measurement result is transmitted from the terminal device is configured to:
control reception of the transmitted channel measurement result from the terminal device; and
control transmission of the received channel measurement result to the other of the first wireless base station or the second wireless base station, and
the control unit of the other of the first wireless base station or the second wireless base station to which the channel measurement result is transmitted from the one of the first wireless base station or the second wireless base station is configured to control reception of the channel measurement result from the one of the first wireless base station or the second wireless base station.

14. The first wireless base station according to claim 12, wherein
based on the transmission method information that indicates the terminal device to transmit the channel measurement result to both of the first wireless base station and the second wireless base station, the control unit of both of the first wireless base station and the second wireless base station is configured to control reception of the channel measurement result from the terminal device.

15. A terminal device, comprising
a control unit configured to:
control reception of a start frame transmitted from a wireless base station, wherein
a channel measurement between the terminal device and the wireless base station is performed based on the start frame,
the start frame includes transmission method information that indicates a transmission method of transmission of a channel measurement result by the terminal device to the wireless base station, and
the channel measurement result is a result of the channel measurement;
control reception of a frame for the channel measurement transmitted from the wireless base station to perform the channel measurement based on the start frame; and
control transmission of the channel measurement result to the wireless base station based on the transmission method indicated by the transmission method information.

16. The terminal device according to claim 15, wherein
based on the transmission method information that indicates the transmission of the channel measurement result to one of a plurality of wireless base stations, the control unit is further configured to control the transmission of the channel measurement result to the one of plurality of wireless base stations indicated by the transmission method information.

17. The terminal device according to claim 15, wherein
based on the transmission method information that indicates the transmission of the channel measurement result to all of a plurality of wireless base stations, the control unit is further configured to control transmission of the channel measurement result to all of the plurality of wireless base stations.

18. The terminal device according to claim 15, wherein
based on transmission of a channel measurement frame by a plurality of wireless base stations at a same timing, the start frame further includes timing information and spatial information for the transmission of the channel measurement frame by the plurality of wireless base stations at a same timing, and
the channel measurement frame is a frame for the channel measurement.

19. The terminal device according to claim 15, wherein
based on transmission of a channel measurement frame by
a plurality of wireless base stations at a different timing,
the start frame further includes timing information for
the transmission of the channel measurement frame by
the plurality of wireless base stations at different timings, and the channel measurement frame is a frame for the channel measurement.

20. The terminal device according to claim 15, wherein
based on transmission of a channel measurement frame to
a plurality of terminal devices after the channel measurement frame is transmitted from all of a plurality of
wireless base stations, the control unit is further configured to:

control reception of a returning frame from the wireless base station that has transmitted the start frame, wherein the returning frame includes information that indicates a returning method of the channel measurement result, and the plurality of terminal devices includes the terminal device;

control reception of the returning frame; and control the transmission of the channel measurement result to at least one of the plurality of wireless base stations based on the returning method included in the received returning frame.

* * * * *